(12) United States Patent
Sonoura et al.

(10) Patent No.: US 12,459,565 B2
(45) Date of Patent: Nov. 4, 2025

(54) MOBILE VEHICLE, METHOD OF CONTROLLING MOBILE VEHICLE, AND PROGRAM

(71) Applicant: Kabushiki Kaisha Toshiba, Tokyo (JP)

(72) Inventors: Takafumi Sonoura, Yokohama (JP); Daisuke Yamamoto, Kawasaki (JP); Hideki Ogawa, Shinagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 18/455,740

(22) Filed: Aug. 25, 2023

(65) Prior Publication Data

US 2024/0317307 A1    Sep. 26, 2024

(30) Foreign Application Priority Data

Mar. 22, 2023  (JP) .................................. 2023-044858

(51) Int. Cl.
*B62D 7/15* (2006.01)
*B60B 15/00* (2006.01)

(52) U.S. Cl.
CPC .................................. *B62D 7/159* (2013.01)

(58) Field of Classification Search
CPC ........ B62D 7/159; B62D 15/00; B60B 19/003
See application file for complete search history.

(56) References Cited

U.S. PATENT DOCUMENTS

| | | | | |
|---|---|---|---|---|
| 5,323,867 | A | * | 6/1994 | Griffin ................. B25J 11/0025 |
| | | | | 180/22 |
| 9,004,202 | B2 | * | 4/2015 | Riwan ..................... B60B 19/14 |
| | | | | 180/7.1 |
| 9,573,416 | B1 | * | 2/2017 | Niemeyer ............. B60B 19/003 |
| 11,130,519 | B1 | * | 9/2021 | Cui ...................... B66F 9/07568 |
| 11,260,717 | B2 | * | 3/2022 | Gao ........................ B62D 61/12 |
| 2018/0194165 | A1 | * | 7/2018 | Min ........................ B60B 19/14 |
| 2019/0055018 | A1 | * | 2/2019 | Bei ........................ B64U 70/92 |
| 2020/0290603 | A1 | * | 9/2020 | Sadamoto ........... B60W 30/143 |
| 2020/0356102 | A1 | * | 11/2020 | Morse ................. G01C 21/1652 |

(Continued)

FOREIGN PATENT DOCUMENTS

| | | |
|---|---|---|
| JP | 11-37951 A | 2/1999 |
| JP | 2007-210576 A | 8/2007 |
| JP | 2010-76630 A | 4/2010 |

*Primary Examiner* — Long T Tran
(74) *Attorney, Agent, or Firm* — Oblon, McClelland, Maier & Neustadt, L.L.P.

(57) ABSTRACT

A mobile vehicle includes: a vehicle body unit; a plurality of vehicle wheel parts; a first driving part configured to be connected to the vehicle wheel parts, and be able to rotate the vehicle wheel parts around a first rotation axis as its rotation center in a first rotation direction; a second driving part configured to connect the vehicle body unit and the first driving part, and be able to rotate the vehicle wheel parts and the first driving part around a second rotation axis as its rotation center in a second rotation direction; and a control unit configured to be disposed in the vehicle body unit and be able to control the first driving part and the second driving part. The vehicle wheel part includes a plurality of sub-vehicle wheel parts that are able to rotate in a third rotation direction different from the first rotation direction.

23 Claims, 14 Drawing Sheets

(56) References Cited

U.S. PATENT DOCUMENTS

2022/0066451 A1* 3/2022 Dalla Libera .......... H04N 23/90
2022/0227168 A1* 7/2022 Schwaiger .......... B60B 27/0052
2022/0229441 A1* 7/2022 Reiserer ................. B60L 53/12

* cited by examiner

FIG. 4
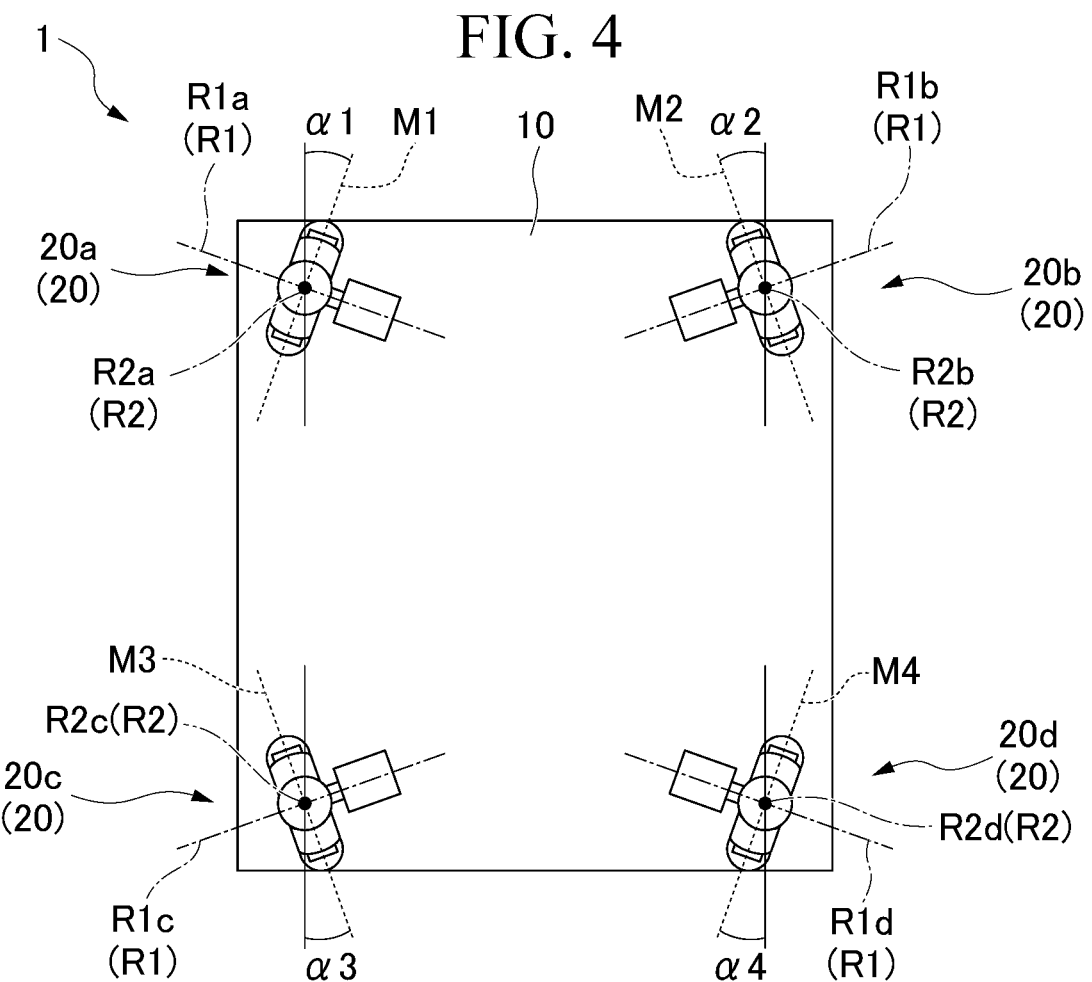
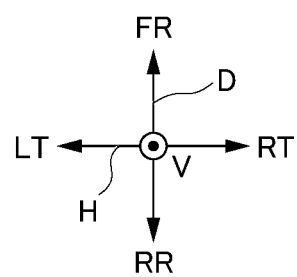

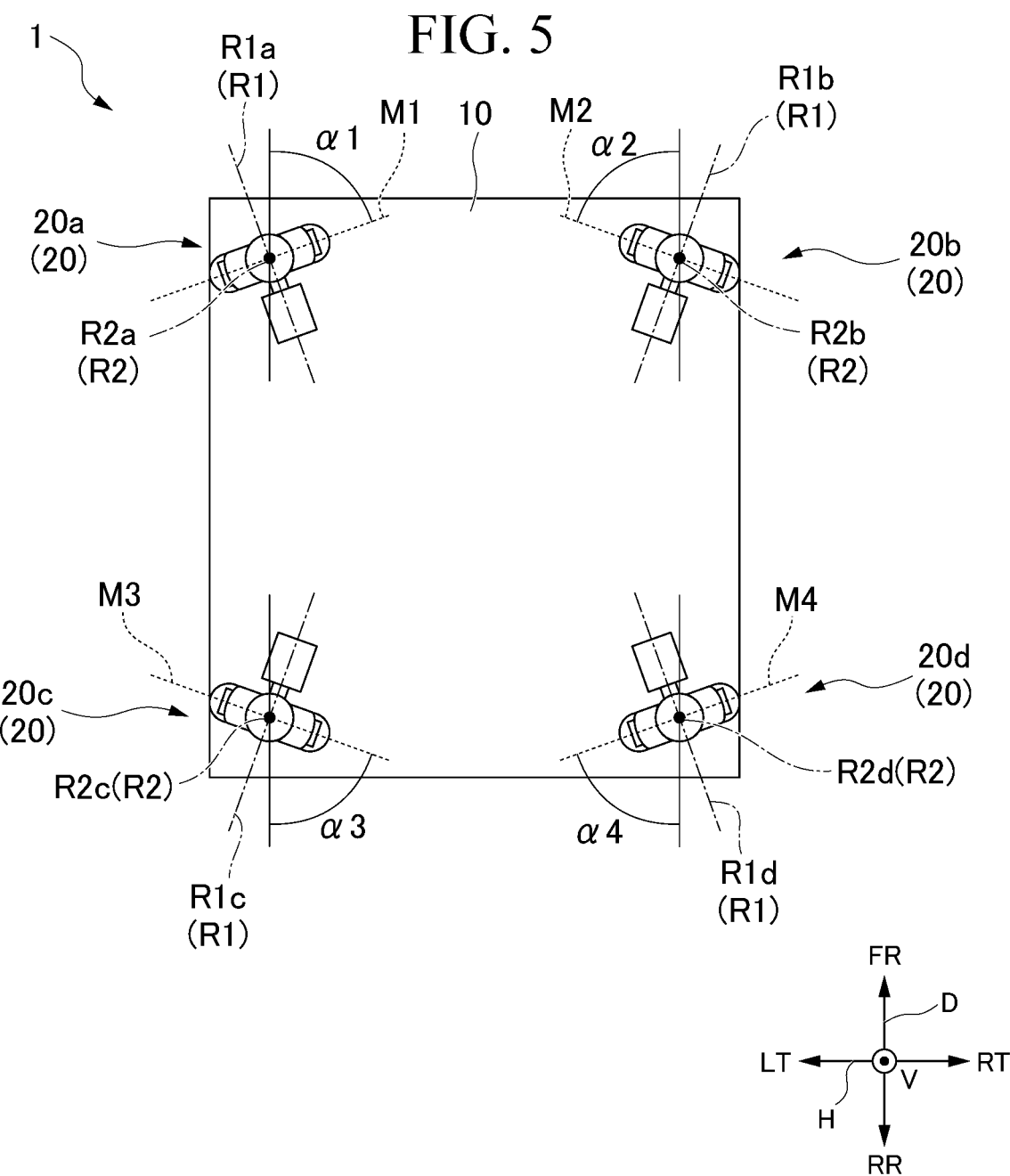

FIG. 7
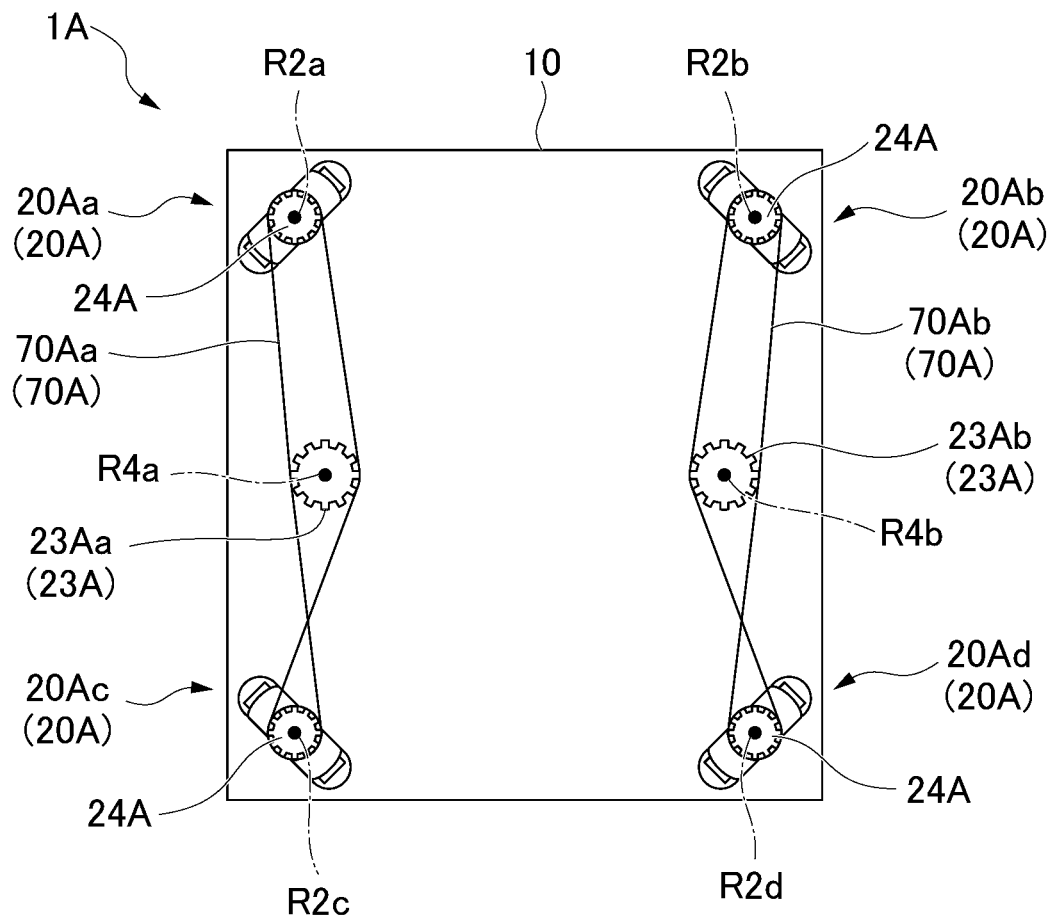
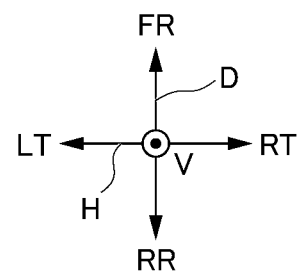

FIG. 8
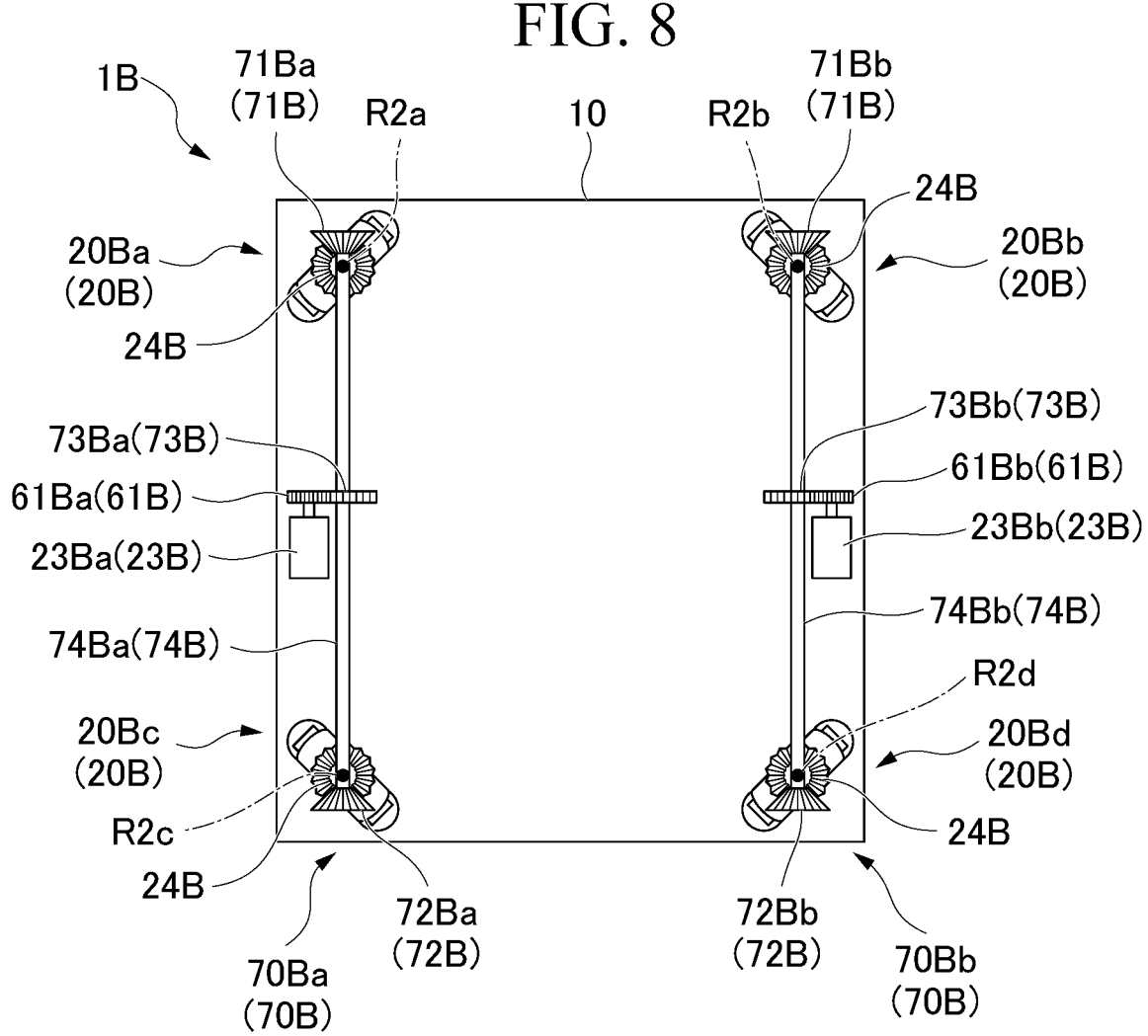
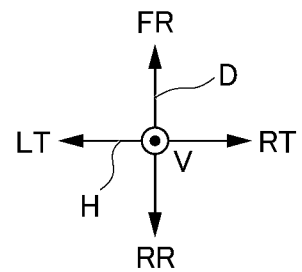

FIG. 11a
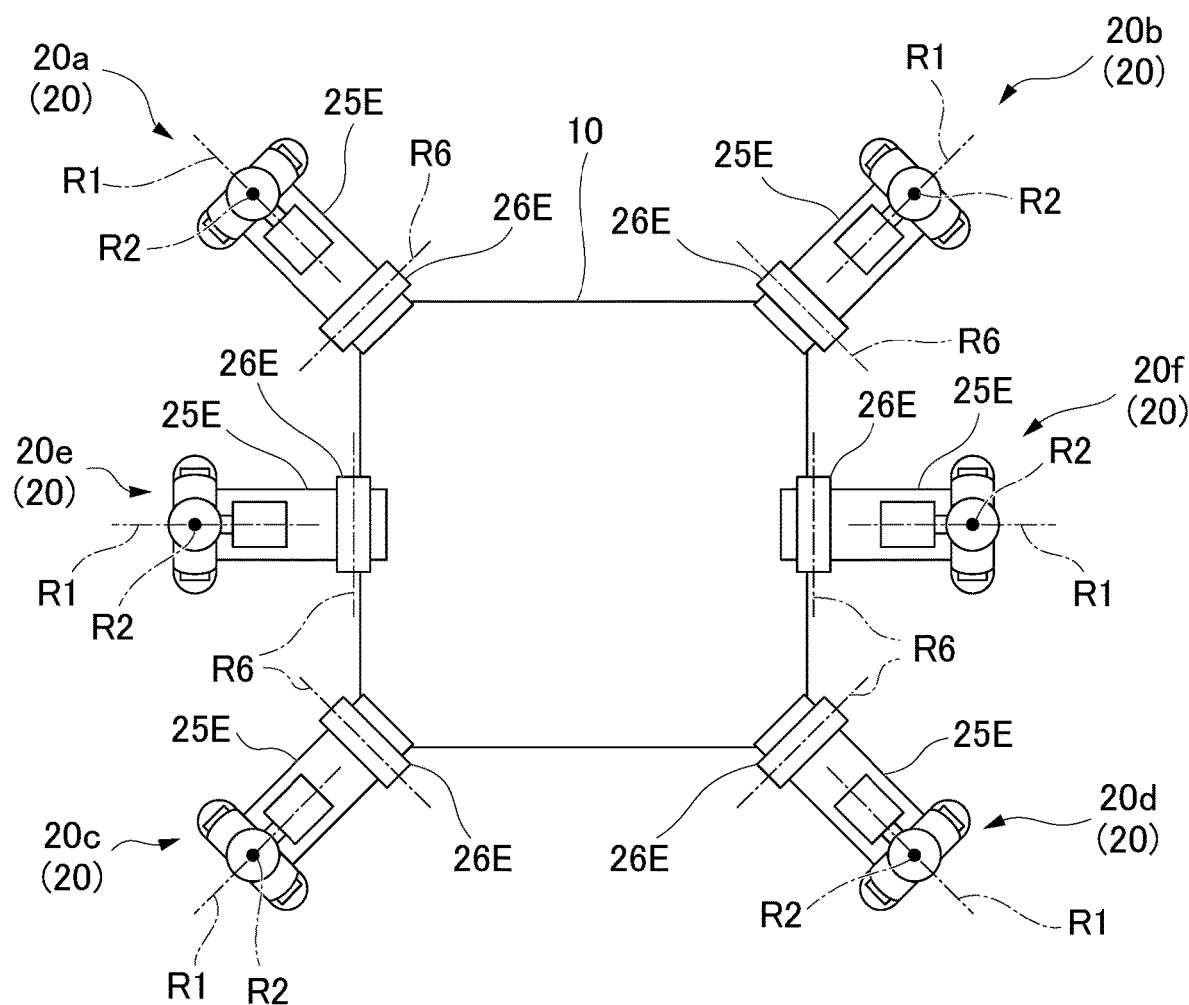
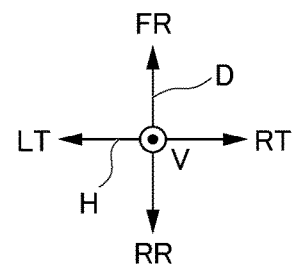

FIG. 12
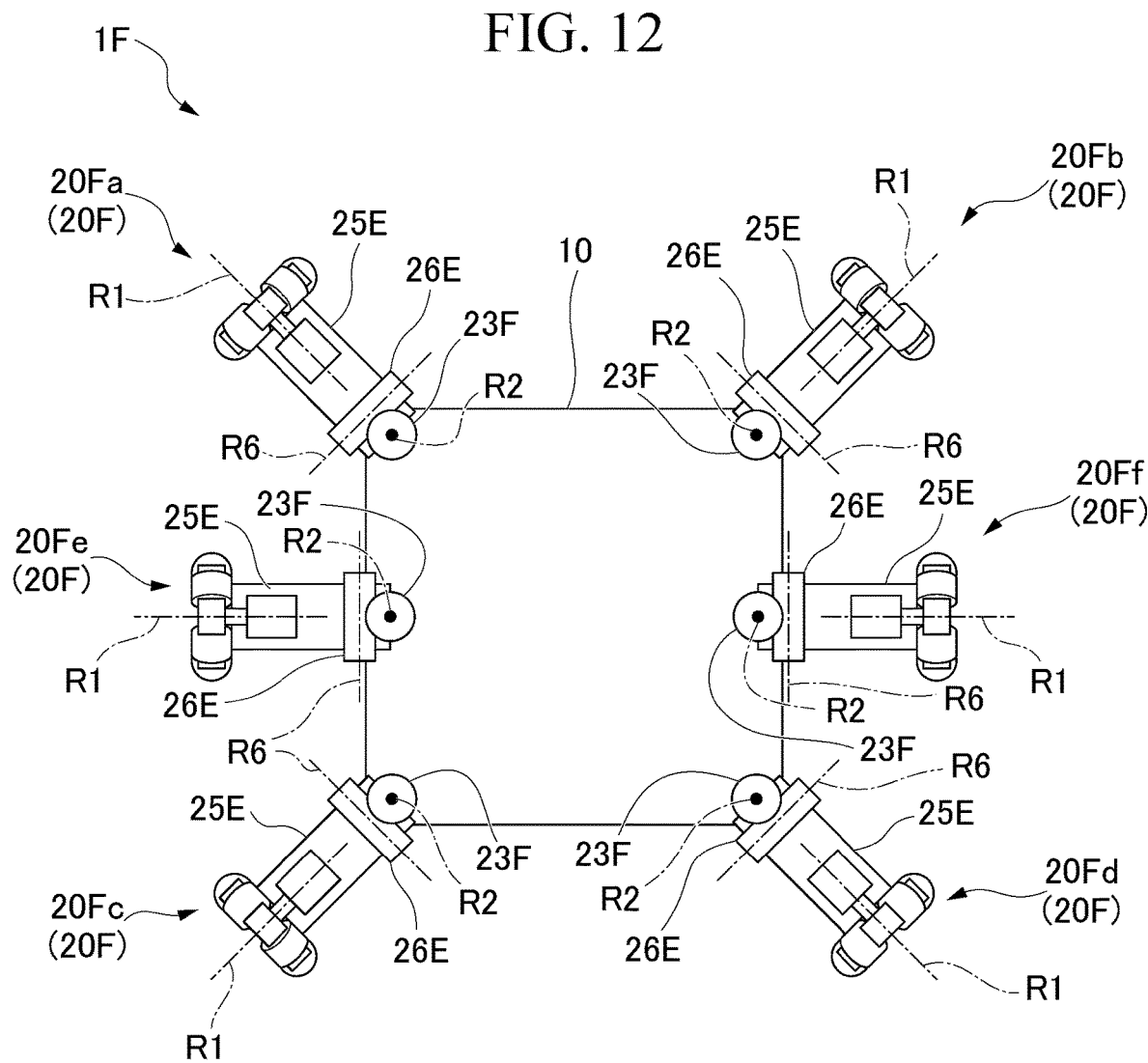
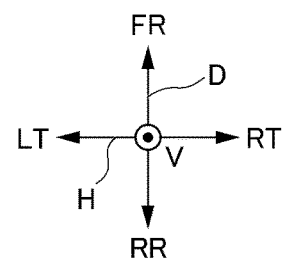

MOBILE VEHICLE, METHOD OF CONTROLLING MOBILE VEHICLE, AND PROGRAM

BACKGROUND OF THE INVENTION

Field of the Invention

An embodiment of the present invention relates to a mobile vehicle, a method of controlling a mobile vehicle, and a program.

Description of Related Art

Conventionally, in order to reduce manpower, robots performing operations in place of people are known. For example, among moving capabilities, high mobility is required for a mobile vehicle robot performing operations accompanying movement in place of people, and in accordance with riding over level difference using a leg vehicle wheel mechanism, omni-directional movement using special vehicle wheels such as omni wheels, and the like, riding-over of a level difference of a floor face, improvement of the degree of freedom in movement, and the like are achieved. When a mobile vehicle robot runs on a road surface that is relatively flat and has repeated fine irregular shapes such as a paved road surface of asphalt or the like or a checkered steel plate used in a factory or the like, there is a likelihood that it may be difficult for the mobile vehicle robot to move in omni-directions while maintaining its mobility.

Patent Documents

[Patent Document 1] Japanese Unexamined Patent Application, First Publication No. 2010-76630

SUMMARY OF THE INVENTION

An object to be achieved by the present invention is to provide a mobile vehicle, a method of controlling a mobile vehicle, and a program having mobility and an omni-directional movement function.

A mobile vehicle according to an embodiment includes: a vehicle body unit; a plurality of vehicle wheel parts; a first driving part configured to be connected to at least one vehicle wheel part included in the plurality of vehicle wheel parts, have a first rotation axis, and be able to rotate the vehicle wheel part around the first rotation axis as its rotation center in a first rotation direction; a second driving part configured to connect the vehicle body unit and the first driving part, have a second rotation axis extending in a different direction from the first rotation axis, and be able to rotate the vehicle wheel part and the first driving part around the second rotation axis as its rotation center in a second rotation direction; and a control unit configured to be disposed in the vehicle body unit and be able to control the first driving part and the second driving part. The vehicle wheel part includes a plurality of sub-vehicle wheel parts that are able to rotate in a third rotation direction different from the first rotation direction.

BRIEF DESCRIPTION OF THE DRAWINGS

FIG. 4 is a plan view illustrating the mobile vehicle at a time when a steering angle is smaller than an angle of a reference posture.

FIG. 5 is a plan view illustrating the mobile vehicle at a time when a steering angle is larger than an angle of a reference posture.

FIG. 7 is a plan view schematically illustrating a mobile vehicle according to Modified Example 1.

FIG. 8 is a plan view schematically illustrating a mobile vehicle according to Modified Example 2.

FIG. 11a is a plan view schematically illustrating a mobile vehicle according to Modified Example 5.

FIG. 12 is a plan view schematically illustrating a mobile vehicle according to Modified Example 6.

DETAILED DESCRIPTION OF THE INVENTION

Hereinafter, a mobile vehicle, a method of controlling a mobile vehicle, and a program according to an embodiment will be described with reference to the drawings. In the following description, the same reference sign will be assigned to components having the same function or functions similar to each other. Duplicate descriptions of such components may be omitted. In addition, "based on XX" described in this application means "based on at least XX" and includes a case on the basis of other elements in addition to XX. Furthermore, "based on XX" is not limited to a case in which XX is directly used and also include a case of being based on a result of performing an arithmetic operation or processing on XX. Here, "XX" is an arbitrary element (for example, arbitrary information).

Figure 1:
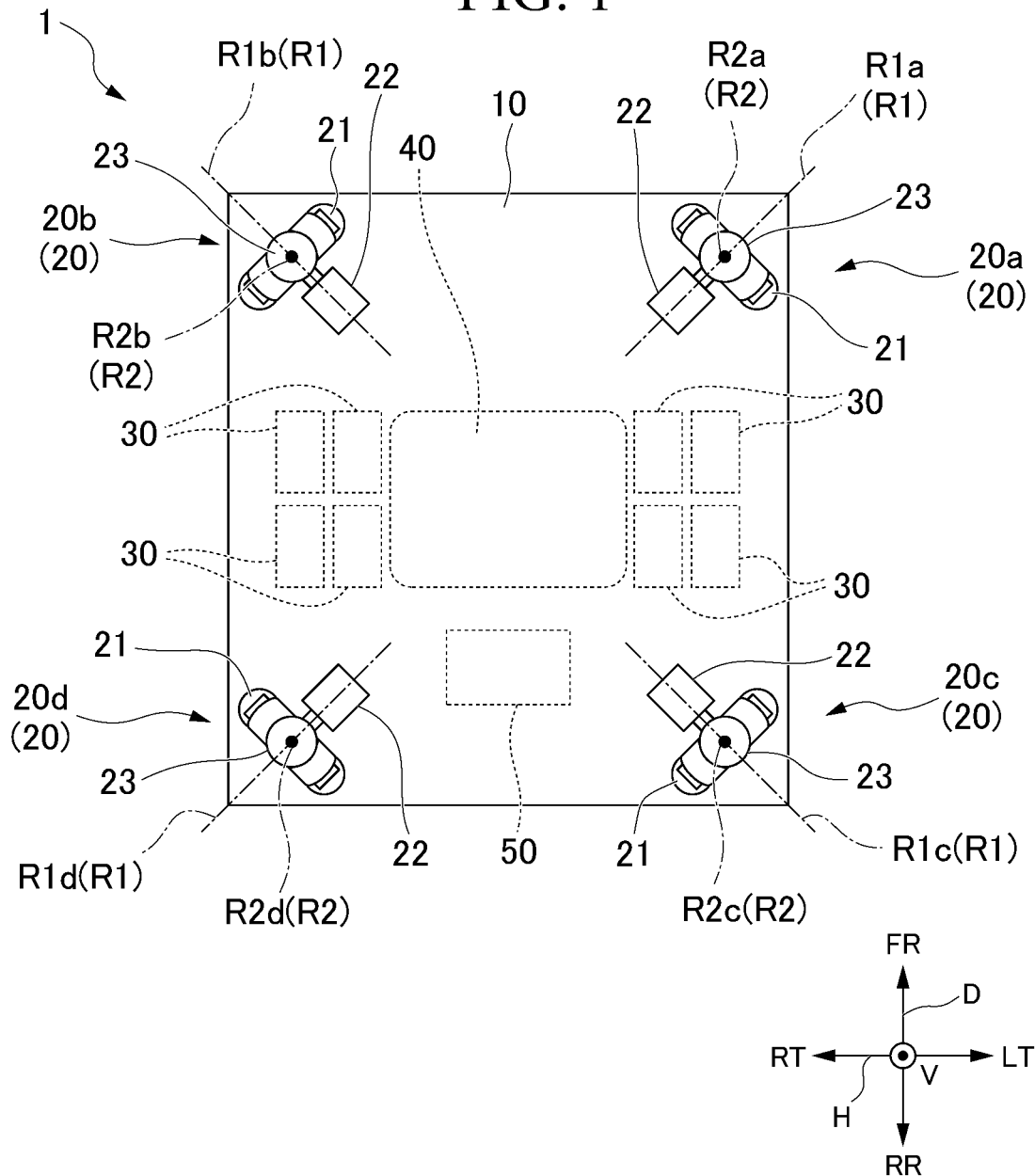
FIG. 1 is a bottom view schematically illustrating a mobile vehicle according to this embodiment.
Figure 2:
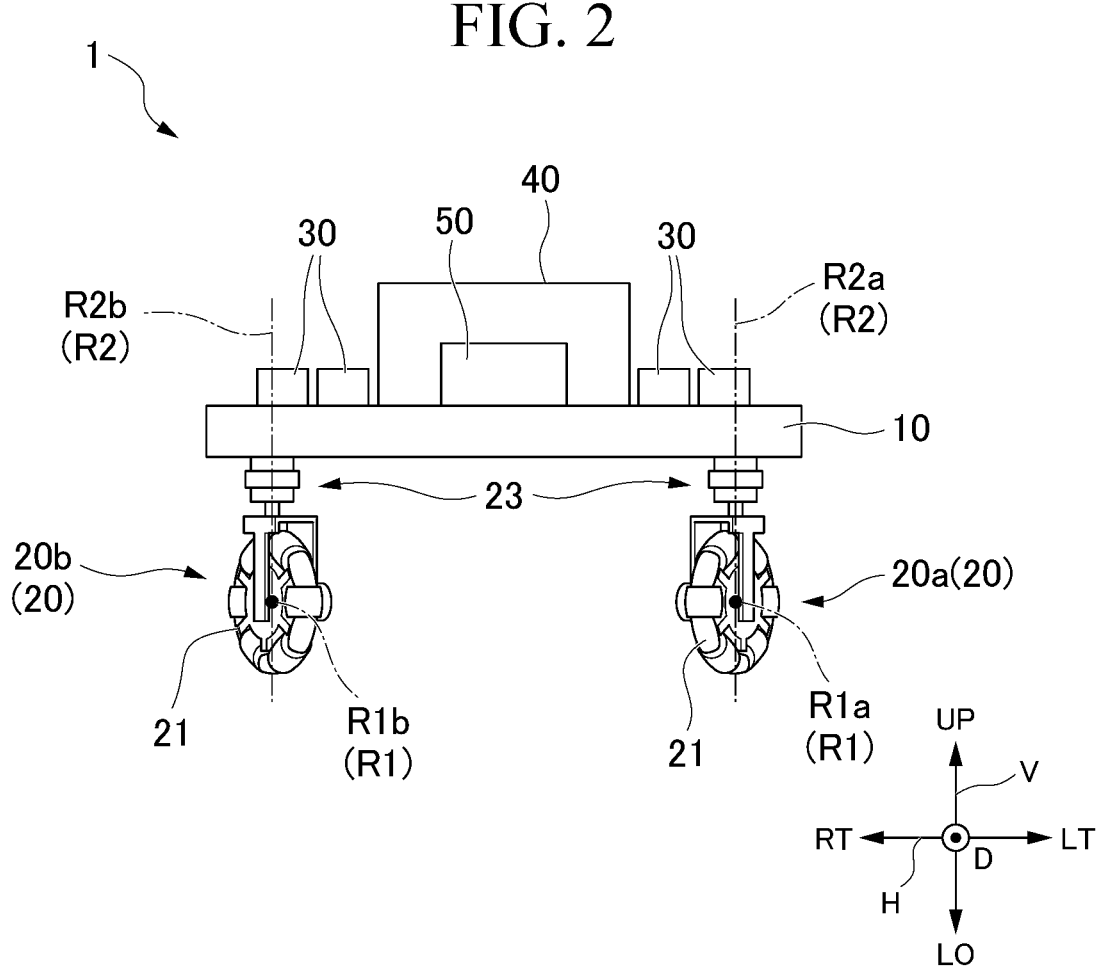
FIG. 2 is a front view schematically illustrating the mobile vehicle.

One embodiment will be described with reference to FIGS. 1 to 12. FIG. 1 is a bottom view schematically illustrating a mobile vehicle 1 according to this embodiment. FIG. 2 is a front view schematically illustrating the mobile vehicle 1 according to this embodiment.

In this embodiment, as illustrated in FIGS. 1 and 2, a vertical direction of the mobile vehicle 1 will be defined as "upward/downward direction V", a vertically upper side will be defined as "upper side UP" in the upward/downward direction V, and a vertically lower side will be defined as "lower side LO" in the upward/downward direction V. In addition, a direction perpendicular to the upward/downward direction V in which the mobile vehicle 1 mainly runs will be defined as "forward/backward direction D," a side toward which the mobile vehicle 1 mainly runs will be referred to as "front side FR" in the forward/backward direction D, and an opposite side will be defined as "rear side RR" in the forward/backward direction D. Furthermore, a direction perpendicular to the upward/downward direction V and the forward/backward direction D will be defined as "leftward/rightward direction H," a left side when seen from the rear side RR will be defined as "left side LT" in the leftward/rightward direction H, and an opposite side will be defined as "right side RT" in the leftward/rightward direction H.

The mobile vehicle 1 includes a vehicle body unit 10, movement devices 20, a motor driver 30, a battery 40, and a control unit 50.

The vehicle body unit 10 is a part that becomes a base part of the mobile vehicle 1. The vehicle body unit 10 is a flat plate having a rectangular shape when seen from the upper side UP. The shape of the vehicle body unit 10 is not limited thereto, and an arbitrary shape such as a circular plate shape or a box shape may be employed. In addition, as the material of the vehicle body unit 10, a known material such as a resin or metal may be used.

The movement devices 20 are parts having movement mechanisms that enable the mobile vehicle 1 to move. The mobile vehicle 1 has four movement devices 20 (20a, 20b, 20c, and 20d) disposed in a lower side LO of the vehicle body unit 10. As illustrated in FIG. 1, the four movement devices 20 are disposed near four corners of the vehicle body unit 10. The number and the arrangement of the movement devices 20 are not limited thereto, and an arbitrary number and an arbitrary arrangement thereof may be employed.

Each of the movement devices 20 includes a vehicle wheel part 21, a first driving part 22, and a second driving part 23. The vehicle body unit 10 and the first driving part 22 are connected using the second driving part 23. In addition, the vehicle wheel part 21 is connected to the first driving part 22.

Figure 3A:
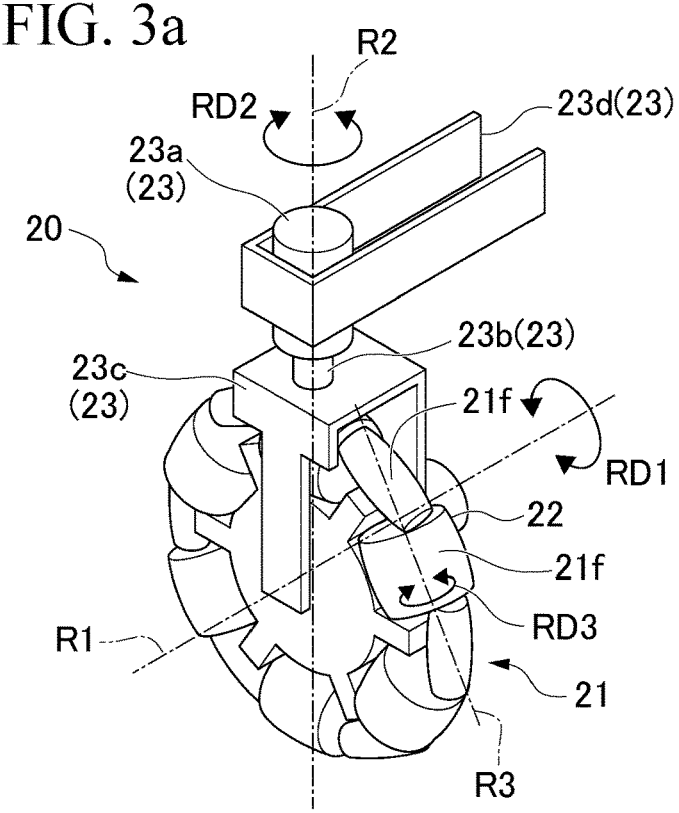
FIG. 3a is a perspective view schematically illustrating a movement device according to this embodiment.
Figure 3B:
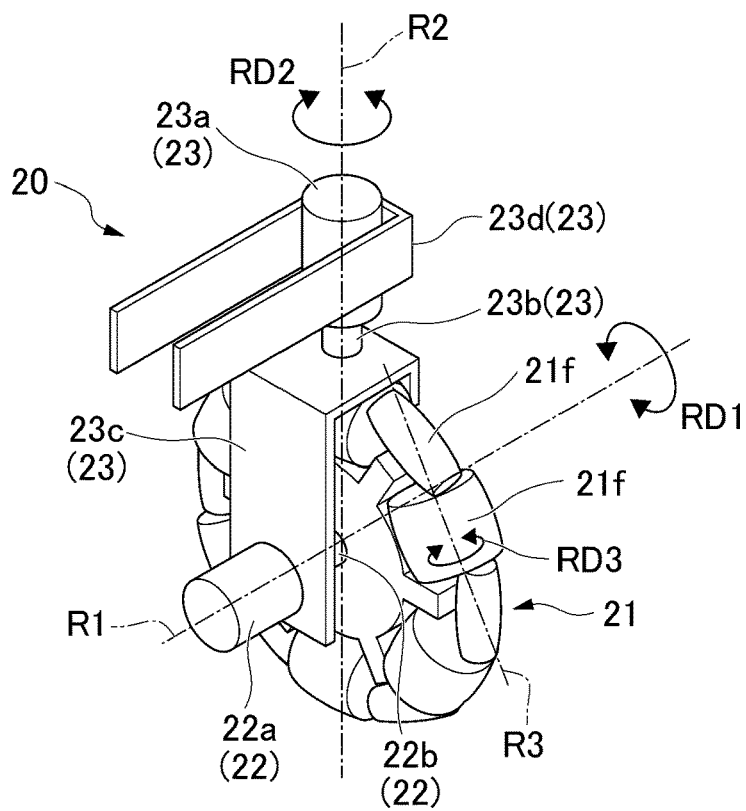
FIG. 3b is a perspective view schematically illustrating this movement device.

FIGS. 3a and 3b are perspective views schematically illustrating one of the movement devices 20. FIG. 3a is a perspective view of the movement device 20 seen in a direction in which the first driving part 22 is not connected to the vehicle wheel part 21. FIG. 3b is a perspective view of the movement device 20 seen in a direction in which the first driving part 22 is connected to the vehicle wheel part 21.

The vehicle wheel part 21 is a known omni wheel having a sub-vehicle wheel part 21f. The sub-vehicle wheel part 21f is a vehicle wheel of a small diameter disposed on the outer periphery of the vehicle wheel part 21. As illustrated in FIGS. 3a and 3b, the vehicle wheel part 21 has 12 large and small sub-vehicle wheel parts 21f. The vehicle wheel part 21 may be an omni-directional driving vehicle wheel that enables the mobile vehicle 1 to move (run) in omni-azimuths, and the number and shape of sub-vehicle wheel parts 21f included in the vehicle wheel part 21 are not limited thereto. In addition, the vehicle wheel part 21 is not limited to the omni-wheel, and a mecanum wheel or the like may be used as the vehicle wheel part 21.

The first driving part 22 is a known electric motor and includes a first motor part 22a and a first motor shaft 22b. As illustrated in FIGS. 3a and 3b, the first motor shaft 22b extends from the first motor part 22a along a first rotation axis R1 and can rotate around the first rotation axis R1 as its rotation center with respect to the first motor part 22a. In addition, the vehicle wheel part 21 is connected to the first motor shaft 22b and can rotate around the first rotation axis R1 as its rotation center in a first rotation direction RD1 with respect to the first motor part 22a together with the first motor shaft 22b.

The second driving part 23 includes a second motor part 23a, a second motor shaft 23b, a support part 23c, and a connection part 23d.

The second motor part 23a and the second motor shaft 23b are a main body part and a shaft part of a known electric motor. As illustrated in FIGS. 3a and 3b, the second motor shaft 23b extends from the second motor part 23a along a second rotation axis R2 and can rotate around the second rotation axis R2 as its rotation center in a second rotation direction RD2 with respect to the second motor part 23a.

The support part 23c is a member having approximately a "U" shape connected to a tip end of the second motor shaft 23b. As illustrated in FIGS. 3a and 3b, the vehicle wheel part 21 is disposed to be interposed in the support part 23c in a direction in which the first rotation axis R1 extends.

In addition, the first driving part 22 is connected to a tip end of the support part 23c. When the second motor shaft 23b of the second driving part 23 rotates in the second rotation direction RD2, the first driving part 22 connected to the tip end of the support part 23c and the vehicle wheel part 21 connected to the first driving part 22 rotate around the second rotation axis R2 as its rotation center in the second rotation direction RD2.

As the material of the support part 23c, a known material such as a resin or metal may be used.

The connection part 23d is a member having approximately a "U" shape connecting the second motor part 23a and the vehicle body unit 10. The second motor part 23a is connected to one end of the connection part 23d. In addition, the vehicle body unit 10 is connected to the other end of the connection part 23d (not illustrated). In the second driving part 23, the second motor part 23a may be connected to the vehicle body unit 10 not through the connection part 23d. In such a case, the second driving part 23 may not include the connection part 23d.

As the material of the connection part 23d, a known material such as a resin or metal may be used.

Since the movement device 20 includes the first driving part 22 and the second driving part 23 described above, the vehicle wheel part 21 and the first driving part 22 can rotate around the second rotation axis R2 extending in the upward/downward direction V as its rotation center in the second rotation direction RD2 with respect to the vehicle body unit 10. In addition, the vehicle wheel part 21 can rotate around the first rotation axis R1 extending in a direction perpendicular to the second rotation axis R2 as its rotation center in the first rotation direction RD1. Although it is preferable that the first rotation axis R1 and the second rotation axis R2 intersect with each other at the center of the vehicle wheel part 21, they may be configured not to intersect with each other at the center of the vehicle wheel part 21.

As illustrated in FIGS. 3a and 3b, the sub-vehicle wheel part 21f included in the vehicle wheel part 21 can rotate around a third rotation axis R3 extending in a different direction from the first rotation axis R1 as its rotation center in a third rotation direction RD3 with respect to the vehicle wheel part 21.

By rotating the vehicle wheel part 21 in the first rotation direction RD1, the mobile vehicle 1 can acquire a driving force for a floor face (ground face) and can move with respect to the floor face (ground face). In addition, by rotating the vehicle wheel part 21 in the second rotation direction RD2, the mobile vehicle 1 can change a direction of the driving force for movement with respect to the floor face (ground face) and run in an arbitrary direction. In addition, since the vehicle wheel part 21 is an omni-directional driving vehicle wheel (for example, an omni-wheel) having a plurality of sub-vehicle wheel parts 21*f* that can rotate in a third rotation direction RD3 different from the first rotation direction RD1, the mobile vehicle 1 has a running direction in omni-azimuths.

As illustrated in FIGS. 1 and 2, the motor driver 30 is disposed on a face of the upper side UP of the vehicle body unit 10. The motor driver 30 is a known motor driver, is connected to the first motor part 22*a* and the second motor part 23*a* of the first driving part 22 and the second driving part 23, and can control the first motor part 22*a* and the second motor part 23*a*.

The mobile vehicle 1 includes 8 motor drivers 30, and the first driving part 22 or the second driving part 23 included in each of four movement devices 20 and each motor driver 30 become one pair and are connected. The number of motor drivers 30 is not limited thereto, and an arbitrary number of motor drivers 30 may be selected in accordance with the number of movement devices 20 and the performance of the motor driver 30. In addition, the motor driver 30 may be included in the first driving part 22 and the second driving part 23.

As illustrated in FIGS. 1 and 2, the battery 40 is disposed on a face of the upper side UP of the vehicle body unit 10. The battery 40 is a power supply device that can supply power to the motor driver 30, the first driving part 22, the second driving part 23, and the control unit 50 to be described below.

As illustrated in FIGS. 1 and 2, the control unit 50 is disposed on a face of the upper side UP of the vehicle body unit 10. The control unit 50 is connected to the motor driver 30 and can control operations of the first driving part 22 and the second driving part 23 by controlling the motor driver 30. More specifically, the control unit 50 calculates rotation numbers, rotation angular velocities, rotation angles, and the like of the first driving part 22 and the second driving part 23 and outputs calculated parameters to the motor driver 30 as control signals (instructions).

The control unit 50 may include a communication unit (not illustrated) that is wirelessly connected to the outside. In accordance with the control unit 50 including the communication unit, the control unit 50 can perform transmission of a signal to the outside, reception of a signal (instruction) from the outside, or the like through the communication unit. The communication unit may be disposed integrally with the control unit 50 or may be connected to the control unit 50 and connected to the outside of the control unit 50. For example, the control unit 50 may receive parameters such as rotation angular velocities, rotation numbers, and the like of the first driving part 22 and the second driving part 23 from the outside and output the received parameters to the motor driver 30.

For example, the control unit 50 is a device (computer) that includes a processor, a memory, a storage unit, and the like and can execute a program. For example, each function of the control unit 50 is realized by one or more processors such as a central processing unit (CPU) or a graphics processing unit (GPU) executing a program stored in a program memory. Here, all or some of these functions may be realized by hardware (for example, a circuit unit; circuitry) such as a large-scale integration (LSI), an application specific integrated circuit (ASIC), a field-programmable gate array (FPGA), and a programmable logic device (PLD). In addition, all or some of the functions may be realized by software and hardware in combination. The storage unit is realized by a flash memory, an electrically erasable programmable read-only memory (EEPROM), a read-only memory (ROM), a random-access memory (RAM), or the like.

The control unit 50 may include a display device such as a display. In accordance with the control unit 50 including the display device, a user can easily check an operating status, breakdown information, and the like of the mobile vehicle 1, and, in a case in which a plurality of mobile vehicles 1 are used, by displaying base body information on the display device, a base body can be easily identified. In addition, the control unit 50 may include a display device having an input function such as a touch panel display or the like. By including a display device having an input function, a user may not transmit an instruction to the control unit 50 through the communication unit from the outside of the mobile vehicle 1 and may directly input an instruction to the control unit 50.

In addition, the control unit 50 may control the battery 40. For example, in accordance with an instruction from the control unit 50, the battery 40 performs power feed for the motor driver 30.

The installation places of the motor driver 30, the battery 40, and the control unit 50 are not limited to the face of the upper side UP of the vehicle body unit 10. All or some of the motor driver 30, the battery 40, and the control unit 50 may be disposed on the face of the lower side LO of the vehicle body unit 10. In addition, in a case in which the vehicle body unit 10 has not a flat plate shape but a box shape, all or some of the motor driver 30, the battery 40, and the control unit 50 may be disposed inside of the box shape.

Next, an example of the method of controlling the mobile vehicle 1 will be described.

FIG. 4 is a plan view illustrating the mobile vehicle 1 at a time when a steering angle α (α1, α2, α3, α4) is smaller than an angle of a reference posture. FIG. 5 is a plan view illustrating the mobile vehicle 1 at a time when a steering angle α (α1, α2, α3, α4) is larger than the angle of a reference posture. Here, a running direction of the mobile vehicle 1 in FIGS. 4 and 5 is assumed to be a forward/backward direction D (mainly, a direction toward the front side FR).

In addition, plan views of FIG. 4 and subsequent diagrams (FIGS. 4 to 12) schematically illustrate positional relations of constituent elements such as the vehicle body unit 10 and the movement device 20. For this reason, in a plan view of the mobile vehicle 1 seen from the upper side UP, although the movement device 20 disposed on the lower side LO of the vehicle body unit 10 is originally not seen, in FIGS. 4 to 12, it is illustrated to be transmitted and seen through the vehicle body unit 10. In addition, some constituent components such as the motor driver 30, the battery 40, the control unit 50, and the like are omitted.

Here, as illustrated in FIGS. 4 and 5, a steering angle α is an angle formed by a driving direction M (M1, M2, M3, M4) that is a direction in which the vehicle wheel part 21 is to be run in accordance with a driving force of the first driving part 22 and a running direction (a forward/backward direction D) of the mobile vehicle 1.

For example, in the mobile vehicle 1 illustrated in FIG. 4, the vehicle wheel part 21 is rotated in the first rotation direction RD1 with the first rotation axis R1 set as its rotation center in accordance with a driving force of the first driving part 22, whereby the mobile vehicle 1 is caused to run toward the front side FR. At this time, a direction toward the front side FR that is a running direction of the mobile vehicle 1 and a driving direction M that is a direction in which the vehicle wheel part 21 is to run in accordance with the driving force of the first driving part 22 deviate from each other by an angle corresponding to the steering angle α. However, since the vehicle wheel part 21 is an omni-directional driving vehicle wheel having a plurality of sub-vehicle wheel parts 21*f* that can be rotated in the third rotation direction RD3 different from the first rotation direction RD1, by controlling the rotation direction, the angular velocity, and the like of the vehicle wheel part 21 in the first rotation direction RD1, the mobile vehicle 1 can run in the running direction (a direction toward the front side FR) deviating from the driving direction M of the vehicle wheel part 21 by the steering angle α.

In addition, by changing the angle of the vehicle wheel part 21 in the second rotation direction RD2 by controlling the second driving part 23, the mobile vehicle 1 can select an arbitrary steering angle α.

The mobile vehicle 1 sets a posture of which a steering angle α is 45 degrees as a reference posture. FIG. 1 illustrates the mobile vehicle 1 at the time of taking the reference posture. When a running direction of the mobile vehicle 1 is a direction toward the front side FR, a mobile vehicle 1 illustrated in FIG. 4 has a steering angle α to be smaller than that of the reference posture, and a mobile vehicle 1 illustrated in FIG. 5 has a steering angle α to be larger than that of the reference posture. Here, the steering angle α of the reference posture of the mobile vehicle 1 is not limited to 45 degrees, and an arbitrary angle may be set to the reference posture.

The mobile vehicle 1 has the vehicle wheel part 21 that is an omni-directional driving vehicle wheel and thus can run toward the front side FR even with the reference posture (α=45 degrees) maintained. In addition, the mobile vehicle 1 can run toward the front side FR also when the steering angle α is smaller than 45 degrees, which is illustrated in FIG. 4, and when the steering angle α is larger than 45 degrees, which is illustrated in FIG. 5.

Here, a speed at which the mobile vehicle 1 runs in the running direction changes in accordance with the steering angle α. For example, in the mobile vehicle 1 running toward the front side FR, in a case in which driving directions M of all the four vehicle wheel parts 21 and the running direction coincide with each other, and the steering angle α is 0 degrees, a maximum translation speed of the mobile vehicle 1, which can be output toward the front side FR when the vehicle wheel parts 21 are rotated at a maximum rotation speed that can be output by the first driving part 22, will be denoted by $V_{max}$.

In a case in which the vehicle wheel parts 21 are omni-wheels, a maximum translation speed that can be output toward the front side FR at the time of the reference posture of which the steering angle α is 45 degrees is about 0.71 $V_{max}$. In addition, when the steering angle α is 15 degrees, a maximum translation speed that can be output toward the front side FR by the mobile vehicle 1 is about 0.96 $V_{max}$.

In this way, by decreasing the steering angle α, the maximum translation speed in the running direction of the mobile vehicle 1 can be increased. At this time, the speed output in a direction different from the running direction (for example, a direction toward the left side LT) is lower than that of the mobile vehicle 1 at the time of the reference posture. However, in a case in which it is clear that the mobile vehicle 1 runs in a direction toward the front side FR, a speed output for moving in a different direction from the running direction is not important, and thus, by decreasing the steering angle α, the mobile vehicle 1 can be caused to efficiently run.

For example, as a case in which the mobile vehicle 1 running toward the front side FR needs to move in a different direction from the running direction such as a direction toward the left side LT or the right side RT, there is a case in which the position of the mobile vehicle 1 is corrected in accordance with a slip of the vehicle wheel part 21, accumulation of error of encoder odometry, and the like. In addition, there is a case in which an unexpected obstacle is present in a running direction, and, by slightly adding a speed component of a different direction from the running direction, a collision is avoided by avoiding the obstacle. For this reason, a speed output in a different direction from a running direction is larger than a speed output that is necessary for linear advancement for the running direction that is a main operation of the mobile vehicle 1, and a continuous speed output is not necessary.

In addition, in the mobile vehicle 1 running in an indoor place in which a runnable space is limited such as a factory, there is a case in which, after running toward the front side FR, the running direction is changed to a direction toward the left side LT, and an operation of turning to the left side LT is performed. At this time, by controlling the second driving part 23, the control unit 50 changes the steering angle α from a posture of which the steering angle α is smaller than that of the reference posture illustrated in FIG. 4 to a posture of which the steering angle α is larger than that of the reference posture illustrated in FIG. 5.

The posture (the steering angle) of the mobile vehicle 1 illustrated in FIG. 5, compared with the posture of the mobile vehicle 1 illustrated in FIG. 4, is a posture in which a speed output for running in the forward/backward direction D is low. However, in a case in which the running direction is the leftward/rightward direction H, the posture of the mobile vehicle 1 illustrated in FIG. 5 is a posture of which a steering angle, which is an angle formed by the running direction and the driving direction of the vehicle wheel part 21, is small. In other words, in a case in which the running direction is the leftward/rightward direction H, the posture of the mobile vehicle 1 illustrated in FIG. 5 is a posture having a large speed output for the running direction.

For this reason, in a case in which, after the mobile vehicle 1 runs with the posture illustrated in FIG. 4 toward the front side FR, it needs to make a turn to the left side LT, by changing the posture to the posture illustrated in FIG. 5 by controlling the second driving part 23, a direction in which the mobile vehicle 1 can output a high speed can be changed to a direction to the left side LT.

As a result, the mobile vehicle 1 can efficiently perform a series of operations of running toward the front side FR and thereafter making a turn to the left side LT. At this time, since the direction (the steering angle) of the vehicle wheel part 21 with respect to the vehicle body unit 10 is changed, there is no change in the direction of the vehicle body unit 10.

A conventional omni-directional mobile vehicle runs in omni-azimuths with a reference posture (α=45 degrees) taken. For this reason, the conventional omni-directional mobile vehicle has a remaining force of the same degree as that of a main operation (running in a running direction) also for a direction having a low likelihood of running, and thus the operation performance of the main operation is constantly suppressed.

The mobile vehicle 1 includes a second driving part 23 that can change the steering angle α of the vehicle wheel part 21 and, by changing the steering angle α by controlling the second driving part 23 using the control unit 50 on the basis of the running direction, compared to a conventional omni-directional mobile vehicle, can suppress degradation of the operation performance for a main running direction.

The control unit 50 may change the steering angle α by controlling the second driving part 23 on the basis of a running speed for the running direction of the mobile vehicle 1. For example, in a case in which the mobile vehicle 1 requires a high running speed for the running direction, the steering angle α may be set to be small. On the other hand, in a case in which the mobile vehicle 1 does not require a high running speed for the running direction, in order to raise the ratio of the operation performance for a different direction from the running direction, by setting the steering angle α to 45 degrees, the mobile vehicle 1 may run with the reference posture.

Figure 6A:
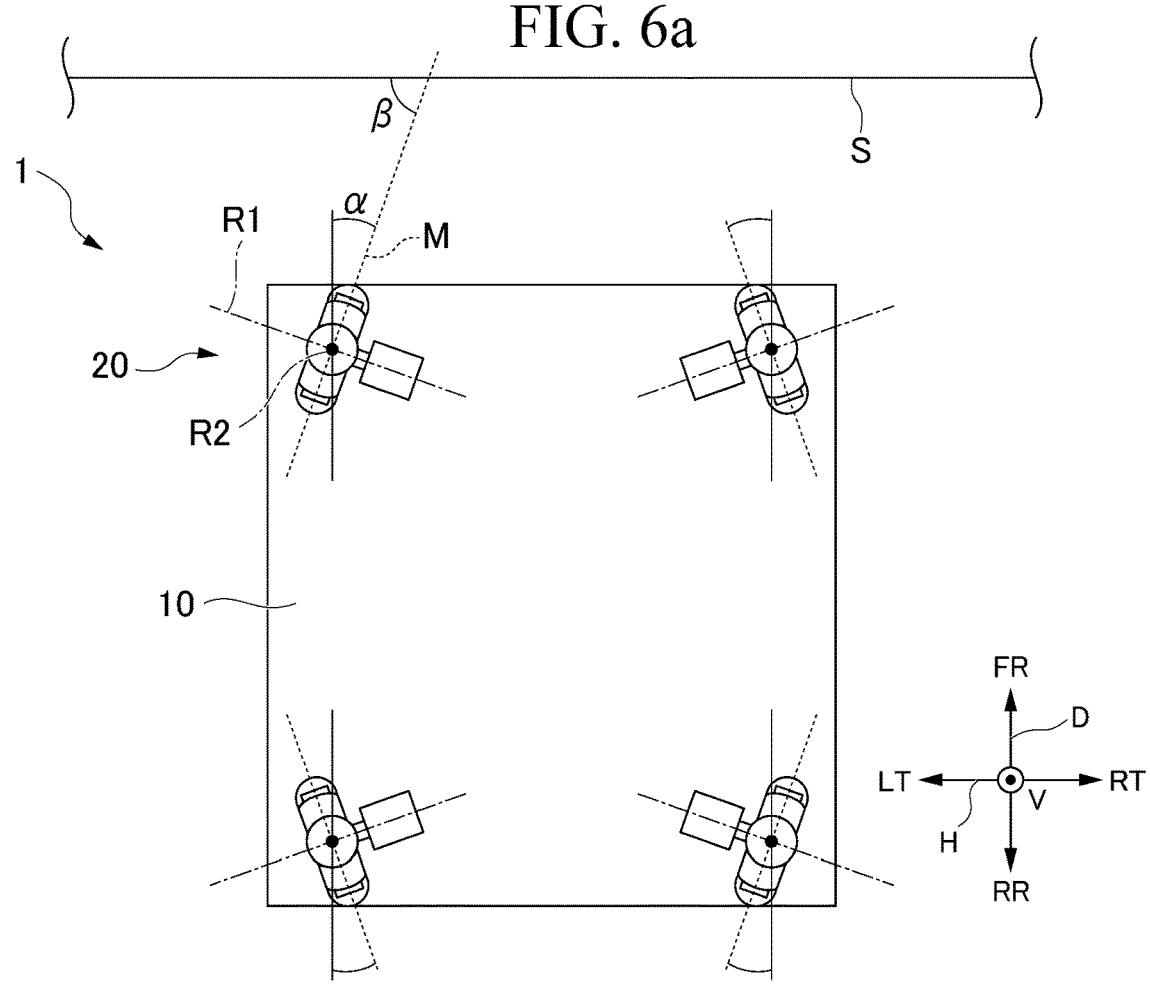
FIG. 6a is a plan view schematically illustrating the mobile vehicle at a time when there is a level difference in a running direction.
Figure 6B:
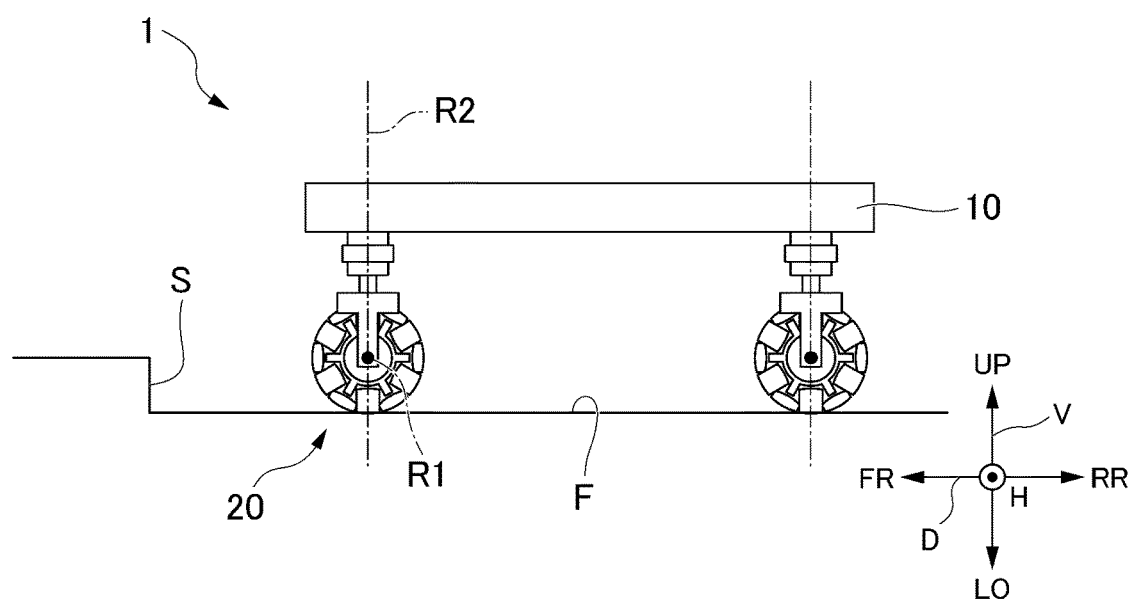
FIG. 6b is a side view schematically illustrating the mobile vehicle at a time when there is a level difference in a running direction.

FIG. 6a is a plan view schematically illustrating the mobile vehicle 1 at a time when there is a level difference S in a running direction (a direction toward the front side FR). FIG. 6b is a side view schematically illustrating the mobile vehicle 1 at a time when there is a level difference S in a running direction (a direction toward the front side FR). As illustrated in FIG. 6b, a level difference S is a level difference protruding to an upper side UP of a floor face F on which the mobile vehicle 1 runs.

The control unit 50 changes the steering angle α by controlling the second driving part 23 such that an approach angle β of the vehicle wheel part 21 for the level difference S is near 90 degrees. In other words, the control unit 50 controls the second driving part 23 such that the steering angle α is small when a level difference S is present in the running direction (a direction toward the front side FR) of the mobile vehicle 1. Here, in the plan view illustrated in FIG. 6a, the approach angle β is an angle formed by a driving direction M and the level difference S.

When the approach angle β is other than 90 degrees, the mobile vehicle 1 rides over the level difference S using not only rotation of the first rotation direction RD1 in the vehicle wheel part 21 but also rotation of the third rotation direction RD3 in the sub-vehicle wheel part 21f. When the approach angle β becomes farther away from 90 degrees, the ratio of usage of rotation of the third rotation direction RD3 in the sub-vehicle wheel part 21f at the time of the mobile vehicle 1 riding over the level difference S becomes higher. On the other hand, when the approach angle β becomes closer to 90 degrees, the ratio of usage of rotation of the first rotation direction RD1 in the vehicle wheel part 21 at the time of the mobile vehicle 1 riding over the level difference S becomes higher.

For this reason, by changing the steering angle α such that the approach angle α of the vehicle wheel part 21 for the level difference S becomes near 90 degrees, the mobile vehicle 1 can ride over the level difference S by efficiently using a driving force according to the first driving part 22 at the time of riding over the level difference S. In addition, the sub-vehicle wheel part 21f has a diameter smaller than that of the vehicle wheel part 21 and has a rotation radius smaller than that of the vehicle wheel part 21. For this reason, by riding over the level difference S using rotation of the vehicle wheel part 21 that has a rotation radius larger than that of the sub-vehicle wheel part 21, the mobile vehicle 1 can stably ride over the level difference S. In addition, in order to avoid the mobile vehicle 1 being in a peculiar posture state to be described below, it is preferable that the approach angle β be not 90 degrees but an angle near 90 degrees, for example, 80 degrees or the like.

Similarly also when the mobile vehicle 1 runs on a floor face on which not a level difference having a height of about a half of the height (diameter) of the vehicle wheel part 21 like the level difference S illustrated in FIG. 6b but fine unevenness such as a checked steel plate is formed, by decreasing the steering angle α for the running direction, the mobile vehicle 1 can stably run.

Next, one example of a method of calculating a rotation angular velocity φ of the first driving part 22 and the steering angle α of the second driving part 23 will be described. Here, the rotation angular velocity φ is an angular velocity with which the first motor shaft 22b of the first driving part 22 rotates in the first rotation direction RD1.

A main running direction (for example, a direction toward the front side FR) that is a direction in which the mobile vehicle 1 mainly runs will be denoted by direction x. In addition, a sub-running direction (for example, a direction toward the left side LT) that is perpendicular to the main running direction will be denoted by direction y. Furthermore, as a speed for the main running direction, the mobile vehicle 1 is assumed to be able to output a speed that is three times a speed for the sub-running direction.

At this time, a maximum speed $Vx_{max}$ for the main running direction and a maximum speed $Vy_{max}$ for the sub-running direction can be represented using Equation 1 and Equation 2.

$$Vx_{max} = V_{max} \cos \alpha \qquad \text{[Equation 1]}$$

$$Vy_{max} = V_{max} \sin \alpha \qquad \text{[Equation 2]}$$

Since the speed for the main running direction is a speed that is three times the speed for the sub-running direction, a relation between $Vx_{max}$ and $Vy_{max}$ can be represented using Equation 3.

$$Vx_{max} = 3 \times Vy_{max} \qquad \text{[Equation 3]}$$

By using Equations 1 to 3, the steering angle α can be acquired. In the case of the example described above (Equations 1 to 3), the steering angle α can be calculated as being about 18.4 degrees.

In Equation 3, with a ratio of the speed for the sub-running direction to the speed for the main running direction (three times in Equation 3) set as a variable value N, a ratio that is necessary at any time may be set in accordance with a distance to a peripheral obstacle of the mobile vehicle 1, a magnitude of movement, and the like. For example, for the mobile vehicle 1, in a case in which an obstacle is present nearby, the variable value N is set to be small, and in a case in which no obstacle is present nearby, the variable value N is set to be large.

From a point of view of kinematics, a relation between a target translation speed of the mobile vehicle 1 and the rotation angular velocity φ of the first driving part 22 can be represented using Equation 4.

$$[Vx_{ref}, Vy_{ref}, W_{ref}] = T_{Inv}(\alpha) \cdot [(\phi_1, \phi_2, \phi_3, \phi_4] \qquad \text{[Equation 4]}$$

In Equation 4, a left side is a 3×1 column vector of target translation speeds ($V_{Xref}$ and $V_{Yref}$) and a target turning angle speed $W_{ref}$ of the mobile vehicle 1. In addition, [φ$_n$(n=1 to 4)] of a right side is a 4×1 column vector. $T_{inv}(\alpha)$ is a 3×4 forward kinematics matrix and is geometrically acquired from a diameter and an installation position of the vehicle wheel part 21, a direction of the vehicle wheel part 21 including the steering angle α, and the like.

When the steering angle α is set, by solving inverse kinematics of Equation 4, a rotation angular velocity φ is acquired. The control unit 50 calculates a steering angle α and a rotation angular velocity φ at each instance on the basis of Equations 1 to 4 and gives an instruction such angle instruction values (α and φ) to the first driving part 22 and the second driving part 23. In addition, the steering angle α used for calculation of the rotation angular velocity φ may be not an angle instruction value $α_{ref}$ for the second driving part 23, which has been calculated in advance, but an actual steering angle $α_{now}$ at a current time point. At this, time, as an actual steering angle $α_{now}$ at a current time point, an angle detected by an encoder or the like included in the second driving part 23 may be used.

In this way, by controlling the first driving part 22 on the basis of the steering angle α, the control unit 50 changes the angular velocity (the rotation angular velocity φ) for the first rotation direction RD1 of the vehicle wheel part 21.

The method of determining the steering angle α is not limited to the example described above, and an evaluation function on which items to be viewed as important at each time in accordance with a control policy are reflected may be prepared, and an optimal steering angle α at which a value of the evaluation function is minimized or maximized may be selected.

For example, in a case in which the mobile vehicle 1 rides over the level difference S, an evaluation function according to the height of the level difference S in the upward/downward direction V is prepared, and a steering angle $α_D$ for stably riding over the level difference S is acquired using this evaluation function. By comparing this $α_D$ with $α_V$ that is a steering angle acquired from the relation between the speed for the main running direction and the speed for the sub-running direction as in the example represented in Equations 1 to 3, a smaller steering angle may be used. In this way, the steering angle α may be determined by combining a plurality of evaluation functions.

In addition, in a mobile vehicle 1 having a plurality of movement devices 20, steering angles of the movement devices 20 may be different from each other. For example, uneven statuses of floor faces (ground faces) of the left side LT and the right side RT of the mobile vehicle 1 are different from each other, and, in a case in which the height of unevenness of the left side LT is higher than the height of unevenness of the right side RT, respective steering angles may be determined such that steering angles α1 and α3 of movement devices 20a and 20c disposed on the left side LT are smaller than steering angles α2 and α4 of movement devices 20b and 20d disposed on the right side RT.

In a known omni-wheel, a small vehicle wheel corresponding to the sub-vehicle wheel part 21f according to this embodiment is a vehicle wheel that is called a free-roller or the like and, generally, is passively rotated. Also, in the mobile vehicle 1 according to this embodiment, the sub-vehicle wheel part 21f of the vehicle wheel part 21 is passively rotated by receiving an external force such as a frictional force generated between the vehicle wheel part 21 rotated by the first driving part 22 and the floor face (ground face) or the like.

For this reason, in the mobile vehicle 1, in a case in which steering angles α of all the four vehicle wheel parts 21 are set to 0 degrees with respect to the main running direction, an output of a speed for the sub-running direction cannot be performed, and, in a case in which a force pressing in a sub-running direction is added from the outside, the mobile vehicle 1 cannot not stand and is passively moved. The posture of such vehicle wheel parts 21 is called a peculiar posture state.

Also when all the four steering angles α are ±90 degrees, the mobile vehicle 1 comes into a peculiar posture state. In addition, when the driving directions M (M1, M2, M3, and M4) of all the four vehicle wheel parts 21 are in parallel with each other, the mobile vehicle 1 comes into a peculiar posture state. For example, a combination of α1=10 degrees, α2=−10 degrees, α3=−10 degrees, and α4=10 degrees is a peculiar posture state as well. Here, regarding the plus and minus of the steering angle α, α is set to be 0 degrees when the driving direction M and the running direction (a direction toward the front side FR) coincide with each other, α1 to α4 illustrated in FIG. 4 are defined as positive (+), and an opposite direction is defined as negative (−).

The control unit 50 changes respective steering angles α such that a peculiar posture state is avoided. For example, in a case in which steering angles α of the vehicle wheel parts 21 that are close to a peculiar posture state are selected, the control unit 50 forcibly changes the respective steering angles α, thereby avoiding a peculiar posture state. In this way, the control unit 50 changes the steering angles α by controlling the second driving part 23 such that the driving direction M of the vehicle wheel part 21 and the running direction of the mobile vehicle 1 are different from each other.

In addition, the control unit 50 may monitor a divergence trend and the like of a target rotation speed of the vehicle wheel part 21 at the time of calculation of inverse kinematics and cause a target value to enter a predetermined numerical value range by forcibly changing the steering angle α when the divergence trend of a predetermined level or more is detected.

In addition, not even in a posture that is not a peculiar posture state, the control unit 50 may avoid a peculiar posture state such that a degree of robustness is further maintained by performing control of the second driving part 23 such that the driving directions M of two or more vehicle wheel parts 21 are avoided from being approximately in parallel with each other.

In addition, when an angular velocity instruction value calculated on the basis of calculation of inverse kinematics is outside the range of an allowed speed for the first driving part 22, the control unit 50 may change the magnitude of the steering angle α such that that the mobile vehicle is away from a peculiar posture state and change the angular velocity instruction value such that the angular velocity instruction value for the first driving part 22 comes inside the range of the allowed speed for the first driving part 22 while the target speed direction of the mobile vehicle 1 is maintained. In accordance with the control unit 50 changing the angular velocity instruction value of the first driving part 22 to be inside the range of the allowed speed, the mobile vehicle 1 can avoid a peculiar posture state more securely.

The mobile vehicle 1 according to this embodiment includes a plurality of the vehicle wheel parts 21, the first driving part 22 that can rotate the vehicle wheel parts 21 around the first rotation axis R1 as its rotation center in the first rotation direction RD1, the second driving part 23 that has the second rotation axis R2 extending in a different direction from that of the first rotation axis R1 and can rotate the vehicle wheel parts 21 and the first driving part 22 around the second rotation axis R2 as its rotation center in the second rotation direction RD2, and the control unit 50 that can control the first driving part 22 and the second driving part 23, in which the vehicle wheel part 21 includes a plurality of the sub-vehicle wheel parts 21f that can rotate in the third rotation direction RD3 different from the first rotation direction RD1.

In accordance with the control unit 50 changing the directions (steering angles α) of the vehicle wheel parts 21 with respect to the running direction of the mobile vehicle 1 by controlling the second driving part 23, the mobile vehicle 1 can move in omni directions while the mobility is maintained.

In the embodiment described above, the mobile vehicle 1 has four vehicle wheel parts 21 and four second driving parts 23 that change the steering angles α of the vehicle wheel parts 21 in correspondence with the vehicle wheel parts 21. The mobile vehicle 1 may have a transfer member and change steering angles of a plurality of the vehicle wheel parts by transferring a driving force of the second driving part to the plurality of the vehicle wheel parts through the transfer member.

FIG. 7 is a plan view schematically illustrating a mobile vehicle 1A according to Modified example 1. A movement device 20A of the mobile vehicle 1A includes a rotation member 24A that can rotate the movement device 20A around second rotation axes R2a, R2b, R2c, and R2d as its rotation center with respect to a vehicle body unit 10. For example, the rotation member 24A is a gear that is passively rotated in accordance with transferred power. The mobile vehicle 1A includes a second driving part 23A and a transfer member 70A. The second driving part 23A is a known electric motor having rotation axes R4a and R4b extending in parallel with the second rotation axes R2a, R2b, R2c, and R2d of the movement device 20A. At a tip end of the rotation shaft of the second driving part 23A, a gear for transferring a driving force of the second driving part 23A is disposed. The transfer member 70A is a member such as a chain or a timing belt that transfers power between a plurality of gears.

As illustrated in FIG. 7, on the left side LT of the mobile vehicle 1A, a transfer member 70Aa is hung over a second driving part 23Aa, a rotation member 24A of a movement device 20Aa, and a rotation member 24A of a movement device 20Ac in the form of "8". For this reason, a driving force of the second driving part 23Aa is transferred to the movement device 20Aa and the movement device 20Ac through the transfer member 70Aa. Similarly, also on the right side RT, a driving force of a second driving part 23Ab is transferred to a movement device 20Ab and a movement device 20Ad through a transfer member 70Ab. As a result, by controlling two second driving parts 23A using the control unit 50, the mobile vehicle 1A can change the steering angles α of four movement devices 20A. In this way, by transferring a driving force of one second driving part 23A to two movement devices 20A through the transfer member 70A, the mobile vehicle 1A according to Modified Example 1 can control two steering angles α of the two movement devices 20A in association with each other. By controlling two steering angles α in association with each other, as in the mobile vehicle 1 according to the embodiment described above, compared to a case in which one steering angle α is controlled by one second driving part 23, although there is a restriction on the method (combination) of taking each steering angle α, the number of actuators (second driving parts) used for changing the steering angle α can be decreased.

FIG. 8 is a plan view schematically illustrating a mobile vehicle 1B according to Modified Example 2. A movement device 20B of the mobile vehicle 1B includes a rotation member 24B that can rotate the movement device 20B around second rotation axes R2a, R2b, R2c, and R2d as its rotation center with respect to a vehicle body unit 10. For example, the rotation member 24B is a gear (a bevel gear or the like) that is passively rotated in accordance with transferred power. The mobile vehicle 1B includes a second driving part 23B and a transfer member 70B. The second driving part 23B is a known electric motor having a rotation axis extending to be perpendicular to second rotation axes R2a, R2b, R2c, and R2d of the movement device 20B. At a tip end of the rotation shaft of the second driving part 23B, a motor transfer part 61B (61Ba and 61Bb) that is gears for transferring a driving force of the second driving part 23B is disposed. In addition, the transfer member 70B includes a transfer shaft 74B (74Ba and 74Bb) of a bar shape extending in parallel with the rotation axis of the second driving part 23B, a first transfer part 71B (71Ba and 71Bb) connected to one end of the transfer shaft 74B, a second transfer part 72B (72Ba and 72Bb) connected to the other end, and a third transfer part 73B (73Ba and 73Bb) disposed in the middle of the transfer shaft 74B. The first transfer part 71B and the second transfer part 72B are gears (bevel gears or the like) engaged with the rotation member 24B. The third transfer part 73B is a gear engaged with the motor transfer part 61B.

As illustrated in FIG. 8, on the left side LT of the mobile vehicle 1, a driving force of the second driving part 23Ba is transferred to the transfer member 70Ba through the motor transfer part 61Ba and the third transfer part 73Ba. In addition, the driving force of the second driving part 23Ba transferred to the transfer member 70Ba is transferred to the movement device 20Ba and the movement device 20Bc through the first transfer part 71Ba and the second transfer part 72Ba. Similarly, on the right side RT, a driving force of the second driving part 23Bb is transferred to the movement device 20Bb and the movement device 20Bd through the transfer member 70Bb. As a result, by controlling two second driving parts 23B using the control unit 50, the mobile vehicle 1B can change steering angles α of four movement devices 20B. Similar to the mobile vehicle 1A according to Modified Example 1, as in the mobile vehicle 1 according to the embodiment described above, compared to a case in which one steering angle α is controlled by one second driving part 23, in the mobile vehicle 1B according to Modified Example 2, although there is a restriction on the method (combination) of taking each steering angle α, the number of actuators (second driving parts) used for changing the steering angle α can be decreased.

Figure 9:
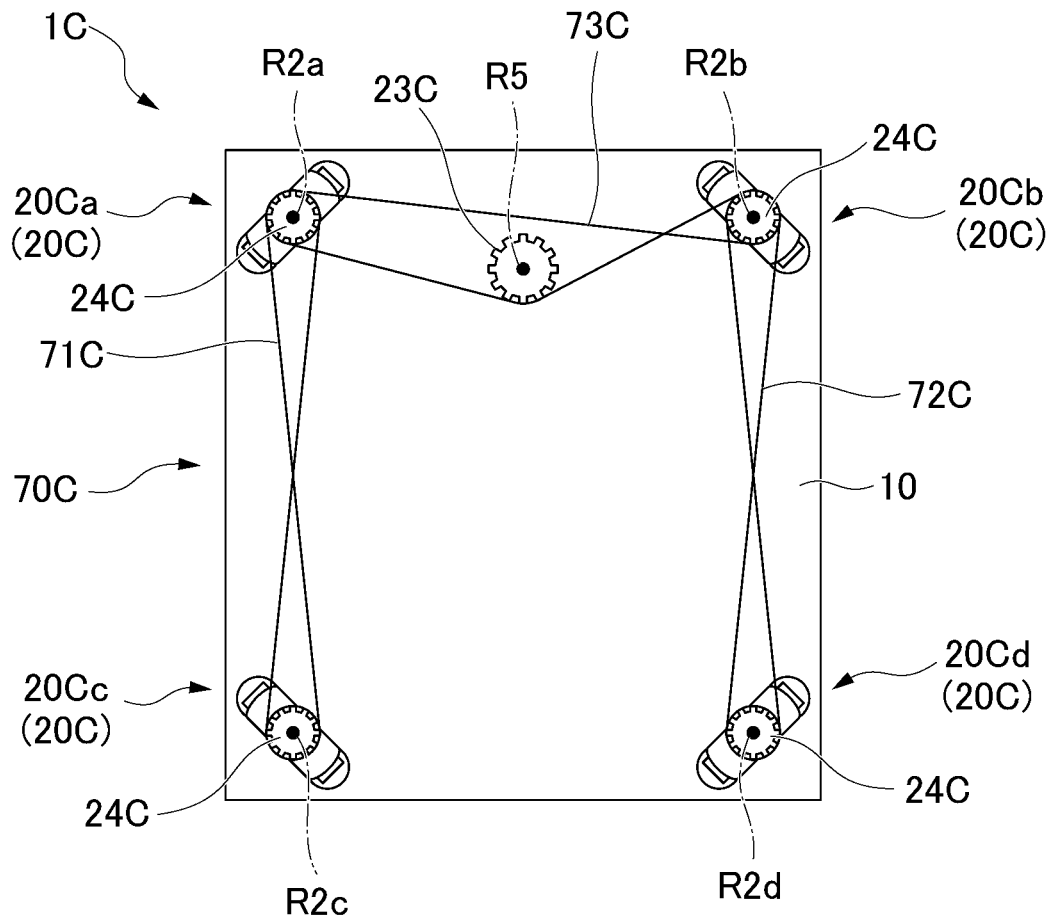
FIG. 9 is a plan view schematically illustrating a mobile vehicle according to Modified Example 3.

FIG. 9 is a plan view schematically illustrating a mobile vehicle 1C according to Modified Example 3. A movement device 20C of the mobile vehicle 1C includes a rotation member 24C that can rotate the movement device 20C around second rotation axes R2a, R2b, R2c, and R2d as its rotation center with respect to a vehicle body unit 10. For example, the rotation member 24C is a gear that is passively rotated in accordance with transferred power. The mobile vehicle 1C includes a second driving part 23C and a transfer member 70C. The second driving part 23C is a known electric motor having a rotation axis R5 extending in parallel with second rotation axes R2a, R2b, R2c, and R2d of the movement device 20C. At a tip end of the rotation shaft of the second driving part 23C, a gear used for transferring a driving force of the second driving part 23C is disposed. In addition, the transfer member 70C is a member such as a chain or a timing belt that transfers power between a plurality of gears and includes a first transfer part 71C, a second transfer part 72C, and a third transfer part 73C.

As illustrated in FIG. 9, on the left side LT of the mobile vehicle 1C, the first transfer part 71C is hung over a rotation member 24C of a movement device 20Ca and a second driving part 23C of a movement device 20Cc in the form of "8". In addition, on the right side RT of the mobile vehicle 1C, the second transfer part 72C is hung over a rotation member 24C of a movement device 20Cb and a rotation member 24C of a movement device 20Cd in the form of "8". In addition, on the front side FR of the mobile vehicle 1C, the third transfer part 73C is hung over a second driving part 23C, a rotation member 24C of a movement device 20Ca, and a rotation member 24C of a movement device 20Cb in the form of "8".

For this reason, the driving force of the second driving part 23C is transferred to the movement device 20Ca, the movement device 20Cb, the movement device 20Cc, and the movement device 20Cd through the transfer member 70C. As a result, by controlling one second driving part 23C using the control unit 50, the mobile vehicle 1C can change steering angles α of four movement devices 20C. In this way, by transferring a driving force of one second driving part 23C to four movement devices 20C through the transfer member 70C, the mobile vehicle 1C according to Modified Example 3 can control four steering angles α of the four movement devices 20C in association with each other. By controlling four steering angles α in association with each other, as in the mobile vehicle 1 according to the embodiment described above, compared to a case in which one steering angle α is controlled by one second driving part 23, although there is a restriction on the method (combination) of taking each steering angle α, the number of actuators (second driving parts) used for changing the steering angle α can be decreased.

In the embodiment described above, the mobile vehicle 1 is assumed to have four movement devices 20. The mobile vehicle 1 may have 5 or more movement devices 20.

Figure 10:
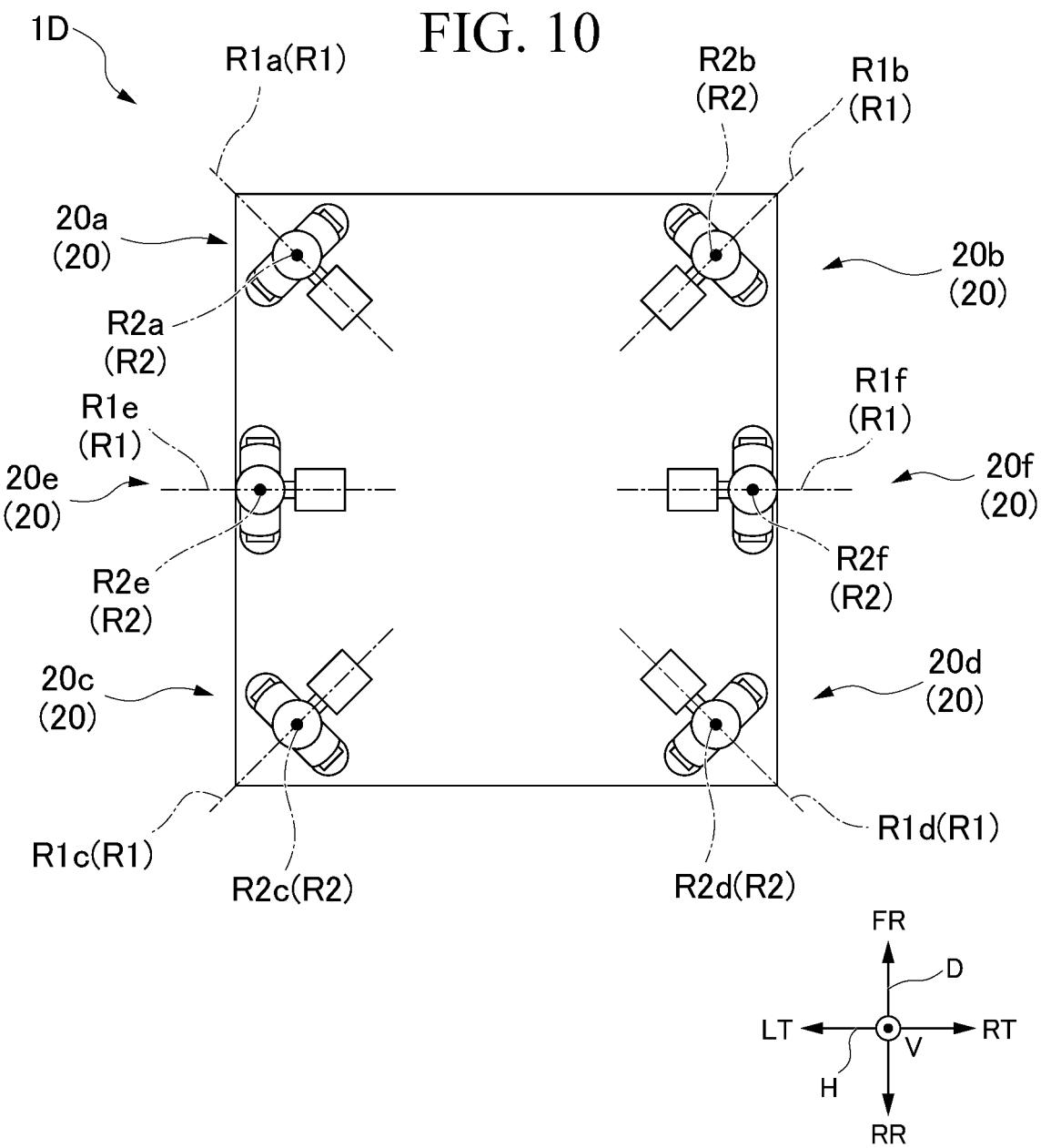
FIG. 10 is a plan view schematically illustrating a mobile vehicle according to Modified Example 4.

FIG. 10 is a plan view schematically illustrating a mobile vehicle 1D according to Modified Example 4.

The mobile vehicle 1D further includes movement devices 20e and 20f in addition to the movement devices 20a, 20b, 20c, and 20d. As illustrated in FIG. 10, the movement device 20e is disposed to be interposed between the movement device 20a and the movement device 20c in the forward/backward direction D. The movement device 20f is disposed to be interposed between the movement device 20b and the movement device 20d in the forward/backward direction D.

Similar to the movement device 20 according to the embodiment described above, the movement device 20e and the movement device 20f respectively have first rotation axes R1e and R1f and second rotation axes R2e and R2f. In the embodiment described above, although the steering angle α of the movement device 20 is changed such that a peculiar posture state is avoided, it is preferable that driving directions of the movement device 20e and the movement device 20f coincide with the main running direction of the mobile vehicle 1D.

Since the steering angles α of the movement devices 20a, 20b, 20c, and 20d are changed such that a peculiar posture state is avoided, even in a case in which the driving directions of the movement device 20e and the movement device 20f coincide with the main running direction of the mobile vehicle 1D, the mobile vehicle 1D can stand a force participating in a sub-running direction and thus is not passively moved in the sub-running direction. In addition, by causing the driving directions of the movement device 20e and the movement device 20f to coincide with the main running direction of the mobile vehicle 1D, all (most of) of speed outputs of the movement device 20e and the movement device 20f can be used for the movement in the main running direction, and thus the mobile vehicle 1D can be moved in the main running direction more stably.

In the embodiment described above, the mobile vehicle 1 has the first driving part 22 and the second driving part 23 that can rotate the vehicle wheel part 21. The mobile vehicle 1 may include a third driving part that can change the height of the vehicle body unit 10 with respect to the vehicle wheel part 21 in the vertical direction (the upward/downward direction V).

Figure 11B:
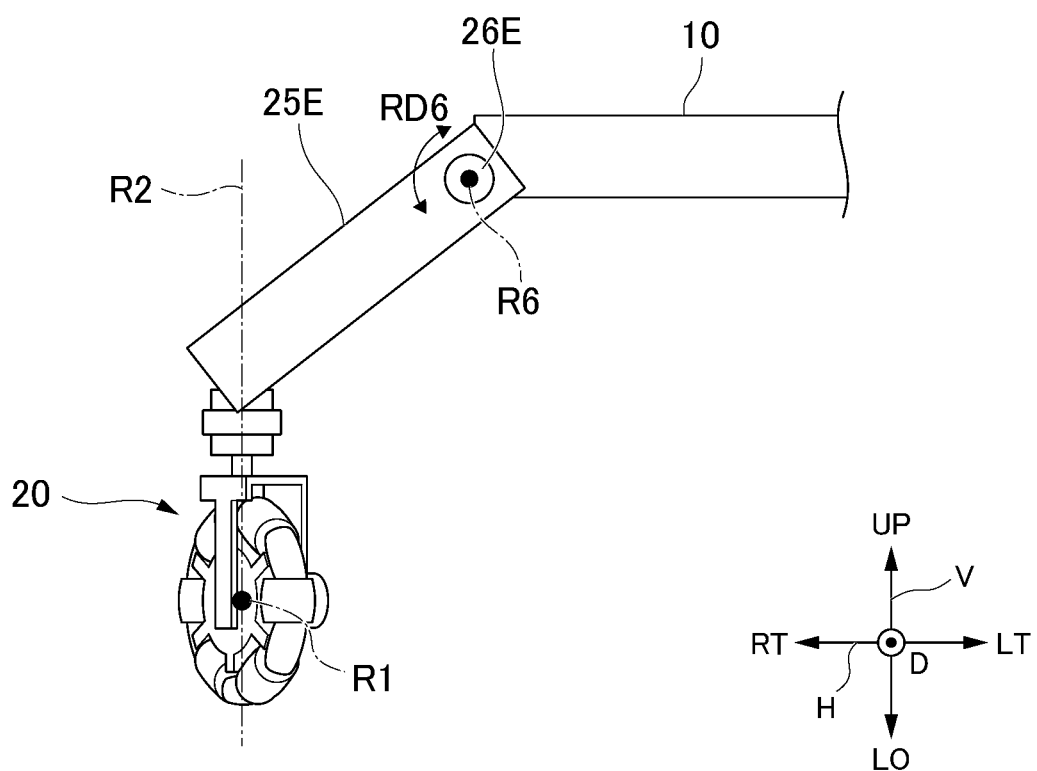
FIG. 11b is a front view schematically illustrating the mobile vehicle.

FIG. 11a is a plan view schematically illustrating a mobile vehicle 1E according to Modified Example 5. FIG. 11b is a front view schematically illustrating an area near a movement device 20 of the mobile vehicle 1E according to Modified Example 5.

The mobile vehicle 1E is a mobile vehicle further including a leg part 25E and a third driving part 26E in the mobile vehicle 1D according to Modified Example 4. The leg part 25E connects the movement device 20 and the vehicle body unit 10. The movement device 20 of the mobile vehicle 1E is connected to the vehicle body unit 10 using the leg part 25E and thus, compared to the movement device 20 of the mobile vehicle 1D according to Modified Example 4, is disposed at a position further away from the vehicle body unit 10.

In addition, the third driving part 26E can rotate around a rotation axis R6 extending in a direction perpendicular to the upward/downward direction V as its rotation center in a rotation direction RD6. By being controlled by the control unit 50, the third driving part 26E rotates in the rotation direction RD6. By rotating the third driving part 26E in the rotation direction RD6, the position of the movement device 20 with respect to the vehicle body unit 10 can be changed.

In the front view illustrated in FIG. 11b, by rotating the third driving part 26E in the rotation direction RD6 clockwise, the leg part 25E is inclined such that the leg part 25E becomes approximately in parallel with the leftward/rightward direction H, and the movement device 20 moves to the right side RT with respect to the vehicle body unit 10 and becomes farther from the vehicle body unit 10 in the leftward/rightward direction H. In addition, in the upward/downward direction V, the movement device 20 becomes closer to the vehicle body unit 10.

By rotating the third driving part 26E in the rotation direction RD6 counterclockwise, the leg part 25E is inclined such that the leg part 25E becomes approximately parallel with the upward/downward direction V, and the movement device 20 moves to the left side LT of the position illustrated in FIG. 11b and becomes closer to the vehicle body unit 10 in the leftward/rightward direction H. In addition, in the upward/downward direction V, the movement device 20 becomes farther away from the vehicle body unit 10 towards the lower side LO.

When the mobile vehicle 1E is operated, the vehicle wheel part 21 of the movement device 20 is grounded to the ground face or the floor face. For this reason, by rotating the third driving part 26E in the rotation direction RD6, the height of the vehicle body unit 10 in the upward/downward direction V (the vertical direction) with respect to the vehicle wheel part 21 is changed, and the height of the vehicle body unit 10 in the upward/downward direction V with respect to the ground face or the floor face is changed.

At this time, regardless of the angle of the leg part 25E in the rotation direction RD6, although it is preferable that the second rotation axis R2 of the movement device 20 be in parallel with the upward/downward direction V, the second rotation axis R2 may be inclined with respect to the upward/ downward direction V. For example, a structure for changing the angle of the movement device 20 with respect to the leg part 25E in association with the rotation operation of the third driving part 26E may be disposed at a connection position between the leg part 25E and the movement device 20, and the leg part 25E may have a parallel link mechanism or the like for maintaining a vertical posture of the movement device 20.

In addition, the third driving part 26E may not be an actuator that is controlled by the control unit 50 and actively rotates but may be a passive suspension mechanism using a spring, a damper, or the like.

Figure 11C:
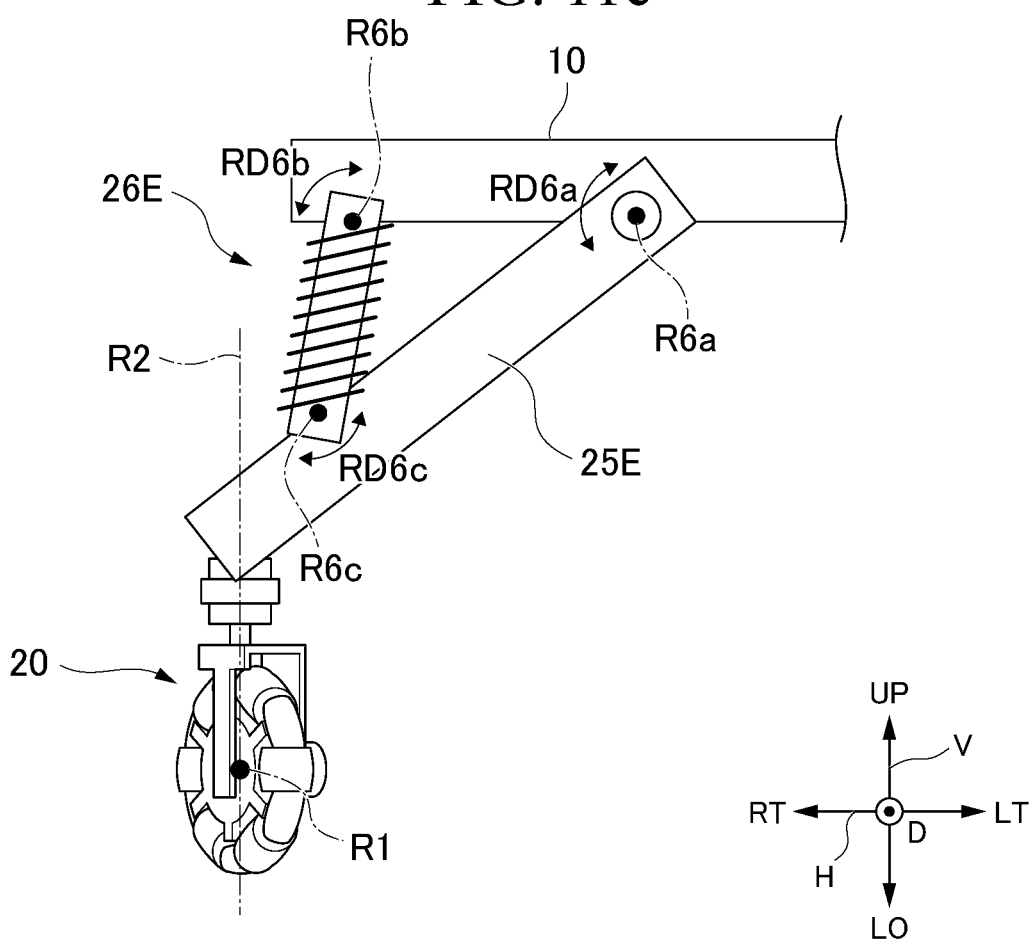
FIG. 11c is a front view schematically illustrating the mobile vehicle.

FIG. 11c is a front view schematically illustrating an example in which the third driving part 26E is a suspension mechanism in the mobile vehicle 1E according to Modified Example 5.

In the example illustrated in FIG. 11c, the vehicle body unit 10 and the leg part 25E are connected using a third driving part 26E that is a suspension mechanism. The leg part 25E illustrated in FIG. 11c is connected to the vehicle body unit 10 such that it can rotate in a rotation direction RD6a around a rotation axis R6a extending in a direction perpendicular to the upward/downward direction V as its rotation center with respect to the vehicle body unit 10. In addition, the leg part 25E is located at a position away from the rotation axis R6a to some degrees and is connected to the vehicle body unit 10 through the third driving part 26E.

The third driving part 26E illustrated in FIG. 11c can rotate around a rotation axis R6b as its rotation center in a rotation direction RD6b with respect to the vehicle body unit 10. In addition, the third driving part 26E can rotate around a rotation axis R6c as its rotation center in a rotation direction RD6c with respect to the leg part 25E. Here, the rotation axis R6b and the rotation axis R6c may preferably extend in parallel with the rotation axis R6a but may not be in parallel with each other.

The third driving part 26E is a suspension mechanism using a spring, a damper, or the like. For this reason, in accordance with expansion and contraction of the third driving part 26E, a distance from the rotation axis R6b to the rotation axis R6c is changed. In other words, by expanding and contracting the third driving part 26E, the height of the vehicle body unit 10 in the upward/downward direction V with respect to the vehicle wheel part 21 can be changed.

In the example illustrated in FIG. 11c, for example, when a freight is load on the face of the upper side UP of the vehicle body unit 10, a spring or the like of the third driving part 26E is compressed in accordance with the weight of the freight, and the vehicle body unit 10 sinks down into the lower side LO. For this reason, a raise of the center of the mobile vehicle 1E in which a freight is loaded is inhibited, and the posture can be inhibited from becoming unstable. At this time, in accordance with rotation in the rotation direction RD6a in the leg part 25E and rotation in the rotation directions RD6b and RD6c in the third driving part 26E, there is no change in the angle of the vehicle body unit 10 with respect to the ground face or the floor face, and thus the freight loaded on the face of the upper side UP of the vehicle body unit 10 can be inhibited from falling. In addition, by including the third driving part 26E that is a suspension mechanism, the mobile vehicle 1E can absorb vibration and the like according to unevenness of the ground face or the floor face and stably move.

Also in the example illustrated in FIG. 11c, a parallel link mechanism or the like for maintaining the vertical posture of the movement device 20 may be included in the leg part 25E.

In addition, the third driving part 26E and the parallel link mechanism described above are not limited to a form in which six movement devices 20 are included as in the mobile vehicle 1E according to Modified Example 5 and may be employed in a form in which four movement devices 20 are included as in the mobile vehicle 1 described in the embodiment described above or a form in which five movement devices 20 are included.

By changing the height of the vehicle body unit 10 with respect to the vehicle wheel part 21 using the third driving part 26E, for example, the mobile vehicle 1E can run by avoiding obstacles placed on the ground face or the floor face in the upward/downward direction V. In addition, by disposing a direct acting actuator that can move the movement device 20 in the upward/downward direction V in the leg part 25E, the height of the vehicle body unit 10 may be changed without changing the angle of the leg part 25E. Furthermore, in accordance with the mobile vehicle 1E including the leg part 25E and the third driving part 26E that can change the height of the movement device 20 with respect to the vehicle body unit 10, when the mobile vehicle 1E rides over the level difference, the mobile vehicle 1E raises the movement device 20 to a position higher than the level difference such that a person can ride over the level difference, and thus the mobile vehicle 1E can easily ride over the level difference.

In the embodiment described above, the first rotation axis R1 and the second rotation axis R2 of the mobile vehicle 1 intersect with each other at the center of the vehicle wheel part 21. The first rotation axis R1 and the second rotation axis R2 may not intersect with each other at the center of the vehicle wheel part 21.

FIG. 12 is a plan view schematically illustrating a mobile vehicle 1F according to Modified Example 6. Similar to the mobile vehicle 1E according to Modified Example 5, the mobile vehicle 1F includes the leg part 25E and the third driving part 26E. In addition, movement devices 20F (20Fa to 20Ff) of the mobile vehicle 1F do not include the second driving part 23 of the mobile vehicle 1 according to the embodiment described above. The second driving part 23F of the mobile vehicle 1F is disposed at a connection position between the leg part 25E and the vehicle body unit 10.

For this reason, the mobile vehicle 1F can change the steering angle by driving the second driving part 23F and rotating the movement device 20F, the leg part 25E, and the third driving part 26E around the second rotation axis R2 as its rotation center.

At this time, the vehicle wheel part 21 swings on an arc orbit with the second rotation axis R2 as its rotation center, and thus the rotation in the first rotation direction RD1 in the vehicle wheel part 21 receives resistance corresponding thereto from the ground face or the floor face. For this reason, in the rotation in the first rotation direction RD1 in the vehicle wheel part 21, in a state being synchronized with movement of the second driving part 23F, in addition to a rotation component for moving the mobile vehicle 1F, by performing control such that a rotation amount acquired by adding rotation amounts corresponding to changes in swinging of a grounded point of the vehicle wheel part 21 around the second rotation axis R2 as its rotation center according to movement of the second driving part 23F is formed, resistance received by the vehicle wheel part 21 from the ground face or the floor face in accordance with rotation around the second rotation axis R2 as its rotation center can be inhibited.

According to at least one embodiment described above, the second driving part 23 having the second rotation axis R2 extending in a different direction from that of the first rotation axis R1 included in the first driving part 22 driving the vehicle wheel part 21 is included, and, by changing the direction of the vehicle wheel part 21 (the steering angle α) for the running direction using the second driving part 23, the mobile vehicle 1 can move in omni directions while mobility is maintained.

Although several embodiments of the present invention have been described, such embodiments are presented as examples and are not intended to limit the scope of the invention. Such embodiments can be performed in other various forms, and, in a range not departing from the concept of the invention, various omissions, substitutions, and changes can be made. Similar to the case of being included in the scope and the concept of the invention, these embodiments and modifications thereof belong to the scope of the invention described in the claims and equivalency thereof.

Explanation of References

1 Mobile vehicle
10 Vehicle body unit
20 Movement device
21 Vehicle wheel part
21f Sub-vehicle wheel part
22 First driving part
23 Second driving part
30 Motor driver
40 Battery
50 Control unit
26E Third driving part
70A Transfer member
R1 First rotation axis
R2 Second rotation axis
R3 Third rotation axis
RD1 First rotation direction
RD2 Second rotation direction
RD3 Third rotation direction
α Steering angle
M Driving direction
S Level difference

What is claimed is:

1. A mobile vehicle comprising:
a vehicle body unit;
a plurality of vehicle wheel parts;
a first driving part configured to be connected to at least one vehicle wheel part included in the plurality of vehicle wheel parts, have a first rotation axis, and be able to rotate the vehicle wheel part around the first rotation axis as its rotation center in a first rotation direction;
a second driving part configured to connect the vehicle body unit and the first driving part, have a second rotation axis extending in a different direction from the first rotation axis, and be able to rotate the vehicle wheel part and the first driving part around the second rotation axis as its rotation center in a second rotation direction; and
a control unit configured to be disposed in the vehicle body unit and be able to control the first driving part and the second driving part,
wherein the vehicle wheel part includes a plurality of sub-vehicle wheel parts that are able to rotate in a third rotation direction different from the first rotation direction, and
the second driving part is configured so that the second rotation axis is configured to change a direction of the first rotation axis.

2. The mobile vehicle according to claim 1,
wherein the control unit changes a rotation number of the vehicle wheel part in the first rotation direction by controlling the first driving part and changes a steering angle that is an angle of the vehicle wheel part in the second rotation direction by controlling the second driving part.

3. The mobile vehicle according to claim 2,
wherein the first rotation axis and the second rotation axis intersect with each other at the center of the vehicle wheel part.

4. The mobile vehicle according to any one of claim 1,
wherein at least three vehicle wheel parts are included, and
wherein a running direction is in omni azimuths.

5. The mobile vehicle according to claim 4,
wherein the control unit changes a steering angle that is an angle of the vehicle wheel part in the second rotation direction by controlling the second driving part on the basis of the running direction.

6. The mobile vehicle according to claim 5,
wherein the control unit changes the steering angle of the vehicle wheel part by controlling the second driving part on the basis of a running speed for the running direction.

7. The mobile vehicle according to claim 5,
wherein the control unit performs control of the second driving part such that the steering angle is decreased when a level difference is present in the running direction of the vehicle wheel part.

8. The mobile vehicle according to claim 5,
wherein the control unit changes an angular velocity of the vehicle wheel part in the first rotation direction by controlling the first driving part on the basis of the steering angle.

9. The mobile vehicle according to claim 5,
wherein the control unit performs control of the second driving part such that a driving direction that is a direction in which the vehicle wheel part need to run in accordance with a driving force of the first driving part and the running direction are different from each other.

10. The mobile vehicle according to claim 5,
wherein the control unit calculates an angular velocity instruction value for the first rotation direction in the first driving part on the basis of inverse kinematics, and when the angular velocity instruction value is outside a range of an allowed speed in the first driving part, changes the angular velocity instruction value to be inside the range of the allowed speed.

11. The mobile vehicle according to claim 5,
further comprising a third driving part configured to be able to change a height of the vehicle body unit in a vertical direction with respect to the vehicle wheel part,
wherein the control unit changes the height of the vehicle body unit by controlling the third driving part.

12. The mobile vehicle according to claim 5,
further comprising a third driving part configured to be able to change a height of the vehicle body unit in a vertical direction with respect to the vehicle wheel part,
wherein the third driving part is a suspension mechanism.

13. The mobile vehicle according to claim 1,
wherein the second driving part is configured so that the second rotation axis intersects the first rotation axis of the first driving part.

14. The mobile vehicle according to claim 13,
wherein the second rotation axis extends in a direction intersecting a moving plane of the mobile vehicle.

15. The mobile vehicle according to claim 13,
wherein the second rotation axis intersects the first rotation axis and extends in a direction from the first driving part to the vehicle body unit.

16. A mobile vehicle comprising:
a vehicle body unit;
a movement device including a plurality of vehicle wheel parts and a first driving part that is connected to at least one vehicle wheel part included in the plurality of vehicle wheel parts and is able to rotate the vehicle wheel part around a first rotation axis as its rotation center in a first rotation direction;
a second driving part disposed in the vehicle body unit;
a transfer member configured to connect the second driving part and two or more movement devices; and
a control unit configured to be disposed in the vehicle body unit and be able to control the first driving part and the second driving part,
wherein the second driving part is able to rotate the two or more movement devices around a second rotation axis extending in a different direction from that of the first rotation axis as its rotation center in a second rotation direction through the transfer member, and
wherein the vehicle wheel part has a plurality of sub-vehicle wheel parts that are able to rotate in a third rotation direction different from the first rotation direction, and
the second driving part is configured so that the second rotation axis is configured to change a direction of the first rotation axis.

17. A method of controlling a mobile vehicle including:
a plurality of vehicle wheel parts,
a first driving part having a first rotation axis and being able to rotate at least one vehicle wheel part included in the plurality of vehicle wheel parts around the first rotation axis as its rotation center,
and a second driving part having a second rotation axis extending in a different direction from the first rotation axis and being able to rotate the vehicle wheel part and the first driving part around the second rotation axis as its rotation center and having a running direction in omni azimuths,
wherein the method comprising:
changing a steering angle that is an angle around the second rotation axis in the vehicle wheel part on the basis of the running direction, and
the second driving part is configured so that the second rotation axis is configured to change a direction of the first rotation axis.

18. The method according to claim 17,
wherein the steering angle of the vehicle wheel part is changed on the basis of a running speed in the running direction.

19. The method according to claim 17,
wherein the steering angle is decreased when a level difference is present in the running direction of the vehicle wheel part.

20. The method according to claim 17,
wherein an angular velocity of the vehicle wheel part around the first rotation axis is changed on the basis of the steering angle.

21. The method according to claim 17,
wherein the steering angle is controlled such that a driving direction that is a direction in which the vehicle wheel part rotating around the first rotation axis need to run and the running direction are different from each other.

22. The method according to claim 17,
wherein an angular velocity instruction value around the first rotation axis is calculated on the basis of inverse kinematics, and when the angular velocity instruction value is outside a range of an allowed speed, the angular velocity instruction value is changed to be inside the range of the allowed speed.

23. A non-transitory computer-readable recording medium storing a program controlling a mobile vehicle including:
a vehicle body unit;
a plurality of vehicle wheel parts;
a first driving part configured to be connected to at least one vehicle wheel part included in the plurality of vehicle wheel parts, have a first rotation axis, and be able to rotate the vehicle wheel part around the first rotation axis as its rotation center;
a second driving part configured to connect the vehicle body unit and the first driving part, have a second rotation axis extending in a different direction from the first rotation axis, and be able to rotate the vehicle wheel part and the first driving part around the second rotation axis as its rotation center; and
a control unit configured to be disposed in the vehicle body unit and be able to control the first driving part and the second driving part, and having a running direction in omni azimuths,
wherein the program causing:
the control unit to change a steering angle that is an angle around the second rotation axis in the vehicle wheel part on the basis of the running direction, and
the second driving part is configured so that the second rotation axis is configured to change a direction of the first rotation axis.

* * * * *